US011831844B2

(12) United States Patent
Stanich et al.

(10) Patent No.: US 11,831,844 B2
(45) Date of Patent: Nov. 28, 2023

(54) PRINT ARTIFACT COMPENSATION MECHANISM USING TRANSFER FUNCTIONS FOR EACH COLOR GENERATED BASED ON INK DEPOSITION FUNCTIONS FOR GROUPS OF NOZZLES

(71) Applicants: Mikel Stanich, Boulder, CO (US); Walter F. Kailey, Boulder, CO (US); Nikita Gurudath, Boulder, CO (US); Ziling Zhang, Boulder, CO (US); Brandon Skogen, Boulder, CO (US)

(72) Inventors: Mikel Stanich, Boulder, CO (US); Walter F. Kailey, Boulder, CO (US); Nikita Gurudath, Boulder, CO (US); Ziling Zhang, Boulder, CO (US); Brandon Skogen, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/684,270

(22) Filed: Mar. 1, 2022

(65) Prior Publication Data
US 2023/0283737 A1 Sep. 7, 2023

(51) Int. Cl.
H04N 1/52 (2006.01)
G06K 15/10 (2006.01)
(Continued)

(52) U.S. Cl.
CPC ............ H04N 1/52 (2013.01); G06K 15/102 (2013.01); H04N 1/00023 (2013.01);
(Continued)

(58) Field of Classification Search
None
See application file for complete search history.

(56) References Cited

U.S. PATENT DOCUMENTS 7,585,038 B2  9/2009  Shibata et al.
8,511,788 B2 *  8/2013  Inoue ............... B41J 29/393
                                                347/19
(Continued)

FOREIGN PATENT DOCUMENTS

CN  107709015  2/2018
CN  110871626  3/2020
JP  4604614 B2  1/2011

OTHER PUBLICATIONS

Jin, Y. A., He, Y., Gao, Q., Fu, J. Z., & Fu, G. Q. (2014). Droplet deviation modeling and compensation scheme of inkjet printing. The International Journal of Advanced Manufacturing Technology, 75(9-12), 1405-1415. See highlighted sections.
(Continued)

Primary Examiner — Scott A Rogers
(74) Attorney, Agent, or Firm — Jaffery Watson Mendonsa & Hamilton LLP

(57) ABSTRACT

A system is disclosed. The system includes at least one physical memory device to store compensation logic and one or more processors coupled with the at least one physical memory device to execute the compensation logic to generate transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count.

20 Claims, 25 Drawing Sheets

(51) Int. Cl.
*H04N 1/00* (2006.01)
*H04N 1/401* (2006.01)

(52) U.S. Cl.
CPC ..... *H04N 1/00034* (2013.01); *H04N 1/00045* (2013.01); *H04N 1/00087* (2013.01); *H04N 1/4015* (2013.01)

(56) References Cited

U.S. PATENT DOCUMENTS

| | | | |
|---|---|---|---|
| 9,218,645 B2 | 12/2015 | Shibata | |
| 9,573,382 B1 | 2/2017 | Metcalfe | |
| 9,738,066 B1* | 8/2017 | Kroon | B41J 2/2142 |
| 10,442,211 B2* | 10/2019 | Stanich | H04N 1/405 |
| 10,449,759 B2 | 10/2019 | Trachanas et al. | |
| 10,538,106 B2 | 1/2020 | Stritzel | |
| 10,696,062 B2 | 6/2020 | Hauck et al. | |
| 11,216,710 B1 | 1/2022 | Stanich | |
| 11,443,152 B1* | 9/2022 | Stanich | H04N 1/6041 |
| 11,630,975 B1* | 4/2023 | Terrab | G03G 15/0105 |
| | | | 358/1.4 |
| 11,632,487 B1* | 4/2023 | Terrab | H04N 1/00034 |
| | | | 358/1.9 |
| 11,636,296 B1* | 4/2023 | Stanich | G06K 15/1878 |
| | | | 358/1.1 |
| 11,637,946 B2* | 4/2023 | Stanich | H04N 1/4015 |
| | | | 358/3.06 |
| 2014/0022601 A1 | 1/2014 | Okubo | |
| 2020/0108632 A1 | 4/2020 | Billow | |
| 2020/0274991 A1 | 8/2020 | Stanich et al. | |
| 2021/0271431 A1 | 9/2021 | Stanich | |
| 2022/0286578 A1* | 9/2022 | Stanich | H04N 1/405 |
| 2022/0286581 A1* | 9/2022 | Kailey | H04N 1/6041 |
| 2023/0120258 A1* | 4/2023 | Stanich | H04N 1/405 |
| | | | 347/15 |
| 2023/0123461 A1* | 4/2023 | Stanich | H04N 1/4015 |
| | | | 347/19 |

OTHER PUBLICATIONS

Notice of Allowance for U.S. Appl. No. 17/684,275, dated Feb. 1, 2023, 8 pages.
Office Action for U.S. Appl. No. 17/684,275, dated Dec. 8, 2022, 16 pages.
Office Action for U.S. Appl. No. 17/684,266 dated Jul. 5, 2023, 15 pages.

* cited by examiner

PRINT ARTIFACT COMPENSATION MECHANISM USING TRANSFER FUNCTIONS FOR EACH COLOR GENERATED BASED ON INK DEPOSITION FUNCTIONS FOR GROUPS OF NOZZLES

FIELD OF THE INVENTION

The invention relates to the field of image reproduction, and in particular, to uniformity compensation.

BACKGROUND

Entities with substantial printing demands typically implement a high-speed production printer for volume printing (e.g., one hundred pages per minute or more). Production printers may include continuous-forms printers that print on a web of print media (or paper) stored on a large roll. A production printer typically includes a localized print controller that controls the overall operation of the printing system, and a print engine that includes one or more printhead assemblies, where each assembly includes a printhead controller and a printhead (or array of printheads). Each printhead contains many nozzles (e.g., inkjet nozzles) for the ejection of ink or any colorant suitable for printing on a medium.

Prior to commencing printing operations, compensation may be performed to compensate for measured response differences for a printhead nozzle which is not jetting properly. Compensation methods are based on uniformity compensation of nozzles. However, various nozzles may become defective which may lead to undesired changes (e.g., artifacts) in jetting output such as voids or banding. For example, some nozzles may be subject to jet-outs, while others may be affected by an overlap between printheads.

Current uniformity compensation relies on multiple process iterations to compensate for a nozzle that is not jetting properly. Having to perform multiple iterations of compensation is an inefficient process as it takes up time and requires more printing of test patterns. Further still, conventional methods may be unable to correct the artifacts sufficiently even when complete.

Accordingly, an improved mechanism to perform nozzle compensation for jet-outs and printhead overlap is desired.

SUMMARY

In one embodiment, a system is disclosed. The system includes at least one physical memory device to store compensation logic and one or more processors coupled with the at least one physical memory device to execute the compensation logic to generate transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count.

BRIEF DESCRIPTION OF THE DRAWINGS

A better understanding of the present invention can be obtained from the following detailed description in conjunction with the following drawings, in which.

DETAILED DESCRIPTION

A print artifact compensation mechanism is described. In the following description, for the purposes of explanation, numerous specific details are set forth to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
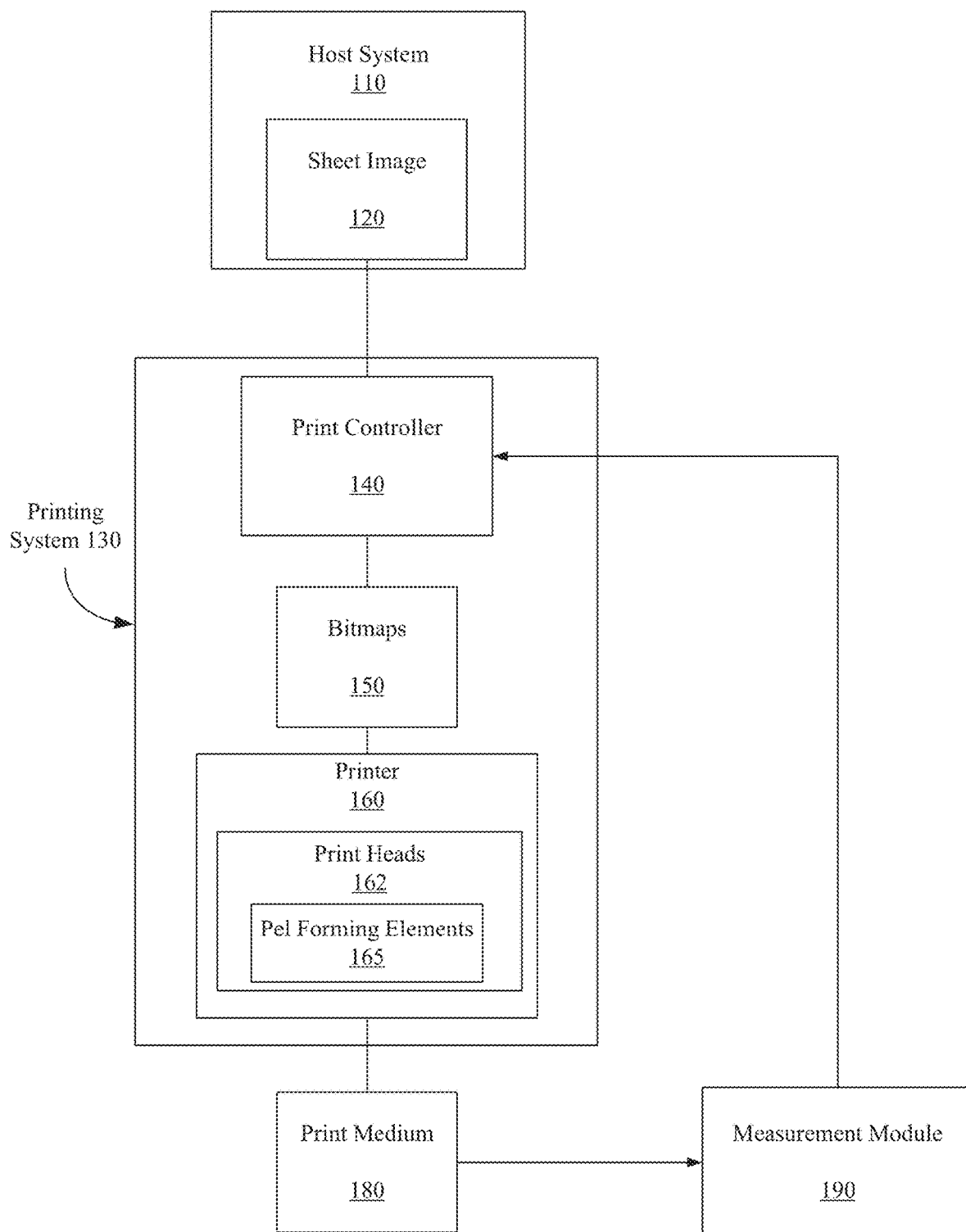
FIG. 1 is a block diagram of one embodiment of a printing system.

FIG. 1 is a block diagram illustrating one embodiment of a printing system 130. A host system 110 is in communication with the printing system 130 to print a sheet image 120 onto a print medium 180 via a printer 160 (e.g., print engine). Print medium 180 may include paper, card stock, paper board, corrugated fiberboard, film, plastic, synthetic, textile, glass, composite or any other tangible medium suitable for printing. The format of print medium 180 may be continuous form or cut sheet or any other format suitable for printing. Printer 160 may be an ink jet, electrophotographic or another suitable printer type.

In one embodiment, printer 160 comprises one or more printheads 162, each including one or more pel forming elements 165 that directly or indirectly (e.g., by transfer of marking material through an intermediary) forms the representation of picture elements (pels) on the print medium 180 with marking material applied to the print medium. In an ink jet printer, the pel forming element 165 is a tangible device that ejects the ink onto the print medium 180 (e.g., an ink jet nozzle) and, in an electro-photographic (EP) printer the pel forming element may be a tangible device that determines the location of toner particles printed on the print medium (e.g., an EP exposure LED or an EP exposure laser).

According to one embodiment, pel forming elements may be grouped onto one or more printheads 162. The pel forming elements 165 may be stationary (e.g., as part of a stationary printhead 162) or moving (e.g., as part of a printhead 162 that moves across the print medium 180) as a matter of design choice. In a further embodiment, pel forming elements 165 may be assigned to one of one or more color planes that correspond to types of marking materials (e.g., Cyan, Magenta, Yellow, and blacK (CMYK)). These types of marking materials may be referred to as primary colors.

Printer 160 may be a multi-pass printer (e.g., dual pass, 3 pass, 4 pass, etc.) wherein multiple sets of pel forming elements 165 print the same region of the print image on the print medium 180. In such an embodiment, the set of pel forming elements 165 may be located on the same physical structure (e.g., an array of nozzles on an ink jet printhead 162) or separate physical structures. The resulting print medium 180 may be printed in color and/or in any of a number of gray shades, including black and white (e.g., Cyan, Magenta, Yellow, and blacK, (CMYK) and secondary colors (e.g., Red, Green and Blue), obtained using a combination of two primary colors). The host system 110 may include any computing device, such as a personal computer, a server, or even a digital imaging device, such as a digital camera or a scanner.

The sheet image 120 may be any file or data that describes how an image on a sheet of print medium 180 should be printed. For example, the sheet image 120 may include PostScript data, Printer Command Language (PCL) data, and/or any other printer language data. The print controller 140 processes the sheet image to generate a bitmap 150 for transmission. The bitmap 150 contains the instructions (e.g., ink drop size and/or location) for the one or more printheads 162 and pel forming elements 165. Bitmap 150 may be a halftoned bitmap (e.g., a compensated halftone bit map generated from compensated halftones, or un-compensated halftone bit map generated from un-compensated halftones) for printing to the print medium 180. The printing system 130 may be a high-speed printer operable to print relatively high volumes (e.g., greater than 100 pages per minute).

The print medium 180 may be continuous form paper, cut sheet paper, and/or any other tangible medium suitable for printing. The printing system 130, in one generalized form, includes the printer 160 that presents the bitmap 150 onto the print medium 180 (e.g., via toner, ink, etc.) based on the sheet image 120. Although shown as a component of printing system 130, other embodiments may feature printer 160 as an independent device communicably coupled to print controller 140.

The print controller 140 may be any system, device, software, circuitry and/or other suitable component operable to transform the sheet image 120 for generating the bitmap 150 in accordance with printing onto the print medium 180. In this regard, the print controller 140 may include processing and data storage capabilities. In one embodiment, measurement module 190 is implemented as part of a compensation system to obtain measurements of the printed medium 180. The measured results are communicated to print controller 140 to be used in a compensation process. The measurement system may be a stand-alone process or be integrated into the printing system 130.

According to one embodiment, measurement module 190 may be a sensor to take optical measurements of printed images on print medium 180. Measurement module 190 may generate and transmit measurement data. Measurement data may be OD (e.g., optical density), perceptual lightness (e.g., $L^*$ in the CIELAB color plane $L^*a^*b^*$) and/or scanned image (e.g., RCSB) data corresponding to a printed image. In one embodiment, measurement module 190 may comprise one or more sensors that individually or in total take measurements for printed markings produced for some or all pel forming elements 165. In another embodiment, measurement module 190 may be a camera system, in-line scanner, densitometer or spectrophotometer.

In a further embodiment, measurement data may include a map information to correlate portions of the measurement data (e.g., OD data) to the corresponding pel forming elements 165 that contributed to the portions of the measurement data. In another embodiment, the print instructions for a test pattern (e.g., step chart) provides the correlation of the portions of the measurement data to the corresponding pel forming elements that contributed to the portions of the measurement data.

Figure 2:
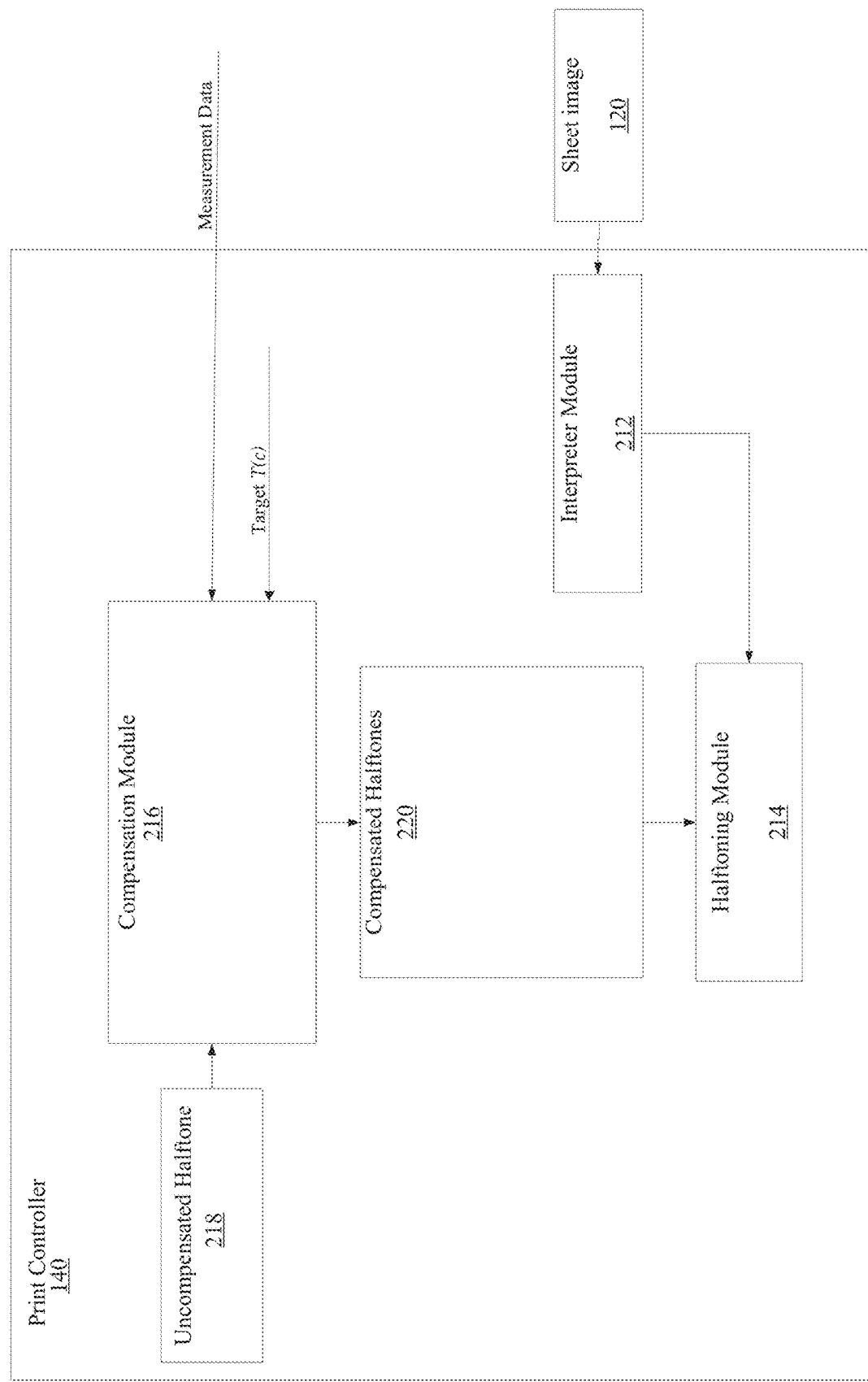
FIG. 2 is a block diagram of one embodiment of a print controller.

FIG. 2 is a block diagram illustrating one embodiment of a print controller 140. The print controller 140, in its generalized form, includes an interpreter module 212, a halftoning module 214, and a compensation module 216. These separate components may represent hardware used to implement the print controller 140. Alternatively, or additionally, the separate components may represent logical blocks implemented by executing software instructions in a processor of the printer controller 140.

The interpreter module 212 is operable to interpret, render, rasterize, or otherwise convert images (e.g., raw sheet-side images such as sheet image 120) of a print job into sheetside bitmaps. The sheetside bitmaps generated by the interpreter module 212 for each primary color are each a 2-dimensional array of pels representing an image of the print job (i.e., a Continuous Tone Image (CTI)), also referred to as full sheetside bitmaps. The 2-dimensional pel arrays are considered "full" sheetside bitmaps because the bitmaps include the entire set of pels for the image. The interpreter module 212 is operable to interpret or render multiple raw sheetsides concurrently so that the rate of rendering substantially matches the rate of imaging of production print engines. In one embodiment, transfer functions may be implemented by print controller 140 and applied directly to image data (e.g., contone data) as a part of the image processing prior to printing. In that case, the contone image data (CTI) is transformed (e.g., compensated) by the transfer functions prior to halftoning.

Halftoning module 214 is operable to represent the sheetside bitmaps as halftone patterns of ink. For example, halftoning module 214 may convert the pels (also known as pixels) to halftone patterns of CMYK ink for application to the paper. A halftone design may comprise a pre-defined mapping of input pel gray levels to output drop sizes based on pel location.

In one embodiment, the halftone design may include a finite set of transition thresholds between a finite collection of successively larger instructed drop sizes, beginning with zero and ending with a maximum drop size (e.g., none, small, medium and or large). The halftone design may be implemented as threshold arrays (e.g., halftone threshold arrays) such as single bit threshold arrays or multibit threshold arrays. In another embodiment, the halftone design may be implemented as a three-dimensional look-up table with all included gray level values.

In a further embodiment, halftoning module 214 performs the multi-bit halftoning using the halftone design consisting of a set of threshold values for each pel in the sheetside bitmap, where there is one threshold for each non-zero ink drop size. The pel is halftoned with the drop size corresponding to threshold values for that pel. This set of thresholds for a collection of pels is referred to as a multi-bit threshold array (MTA).

Multi-bit halftoning is a halftone screening operation in which the final result is a selection of a specific drop size available from an entire set of drop sizes that the print engine is capable of employing for printing. Drop size selection based on the contone value of a single pel is referred to as "Point Operation" halftoning. The drop size selection is based on the pel values in the sheetside bitmap. This contrasts with "Neighborhood Operation" halftoning, where multiple pels in the vicinity of the pel being printed are used to determine the drop size. Examples of neighborhood operation halftoning include the well-known error diffusion method.

Multi-bit halftoning is an extension of binary halftoning, where binary halftoning may use a single threshold array combined with a logical operation to decide if a drop is printed based on the contone level for a pel. Binary halftoning uses one non-zero drop size plus a zero drop size (i.e., a drop size of none where no ink is ejected). Multi-bit halftoning extends the binary threshold array concept to more than one non-zero drop size.

Multi-bit halftoning may use multiple threshold arrays (i.e., multi-bit threshold arrays), one threshold array for each non-zero drop size. The point operation logic is also extended to a set of greater than and less than or equal to operations to determine the drop size by comparing the threshold and image contone data for each pel. Multi-bit defines a power of two set of drop sizes (e.g., two-bit halftone designs have four total drops, including a zero drop size). While power of two may be employed to define the number of drops, systems not following this such as a three total drop system may be used and are still considered multi-bit.

Compensation module 216 performs a compensation process on an un-compensated halftone 218, or previously generated uniformity compensated halftone, received at print controller 140 to generate one or more compensated halftones 220. Compensated halftones 220 are then received at halftoning module 214 along with the sheetside bitmap. In one embodiment, an un-compensated halftone 218 represents a reference halftone design that is modified to create the compensated halftones. In such an embodiment, measurements of the system response are received via measurement module 190 using the un-compensated halftone 218 for printing the system response.

According to one embodiment, compensation module 216 may also be implemented to perform compensation for defective pel forming elements 165. In such an embodiment, defective pel forming elements 165 may result from jet-outs and/or incorrect printhead overlap.

Jet-Out Compensation

Figure 3:
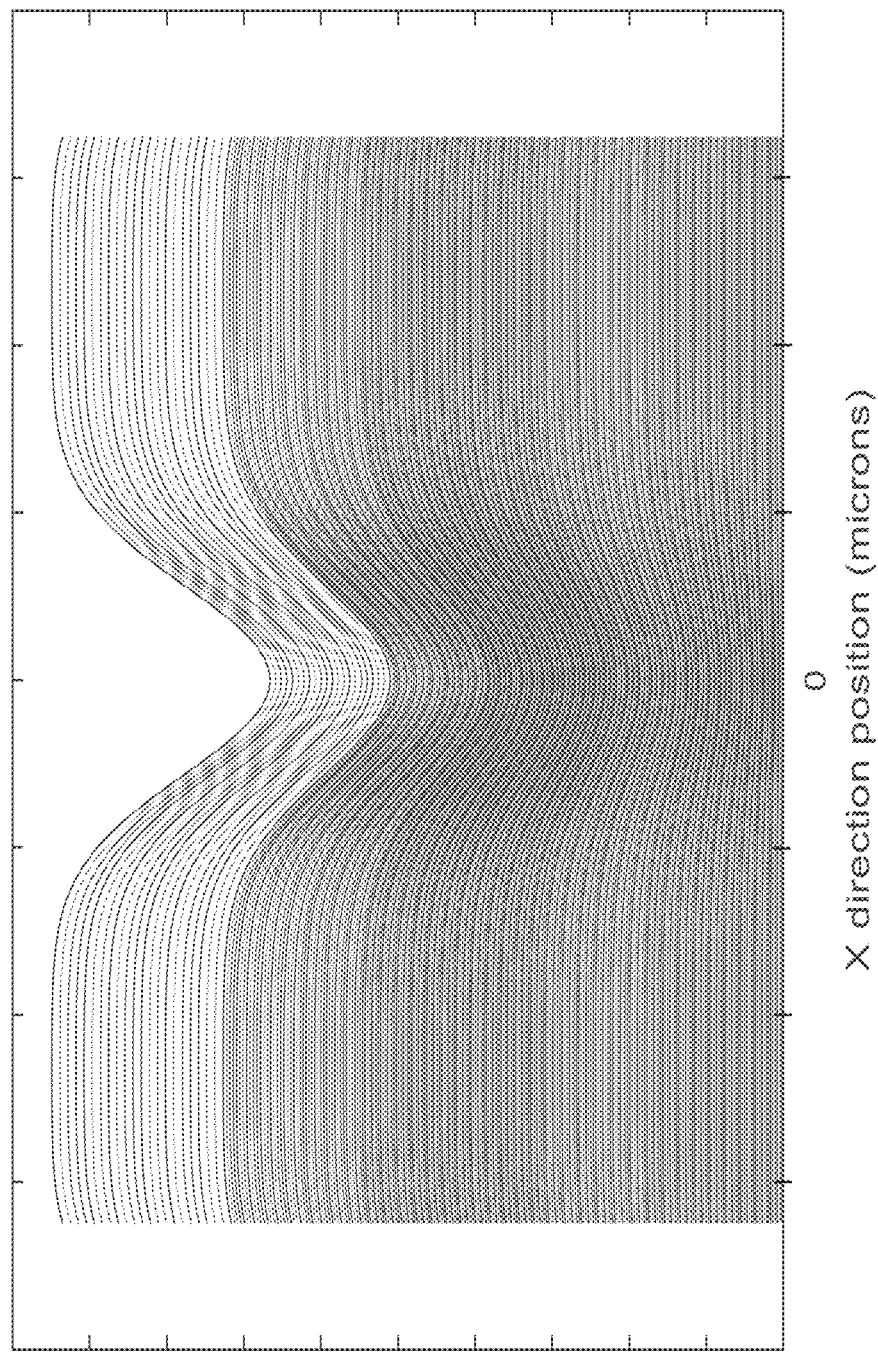
FIG. 3 is a graph illustrating jet-out ink deposition without compensation.
Figure 4:
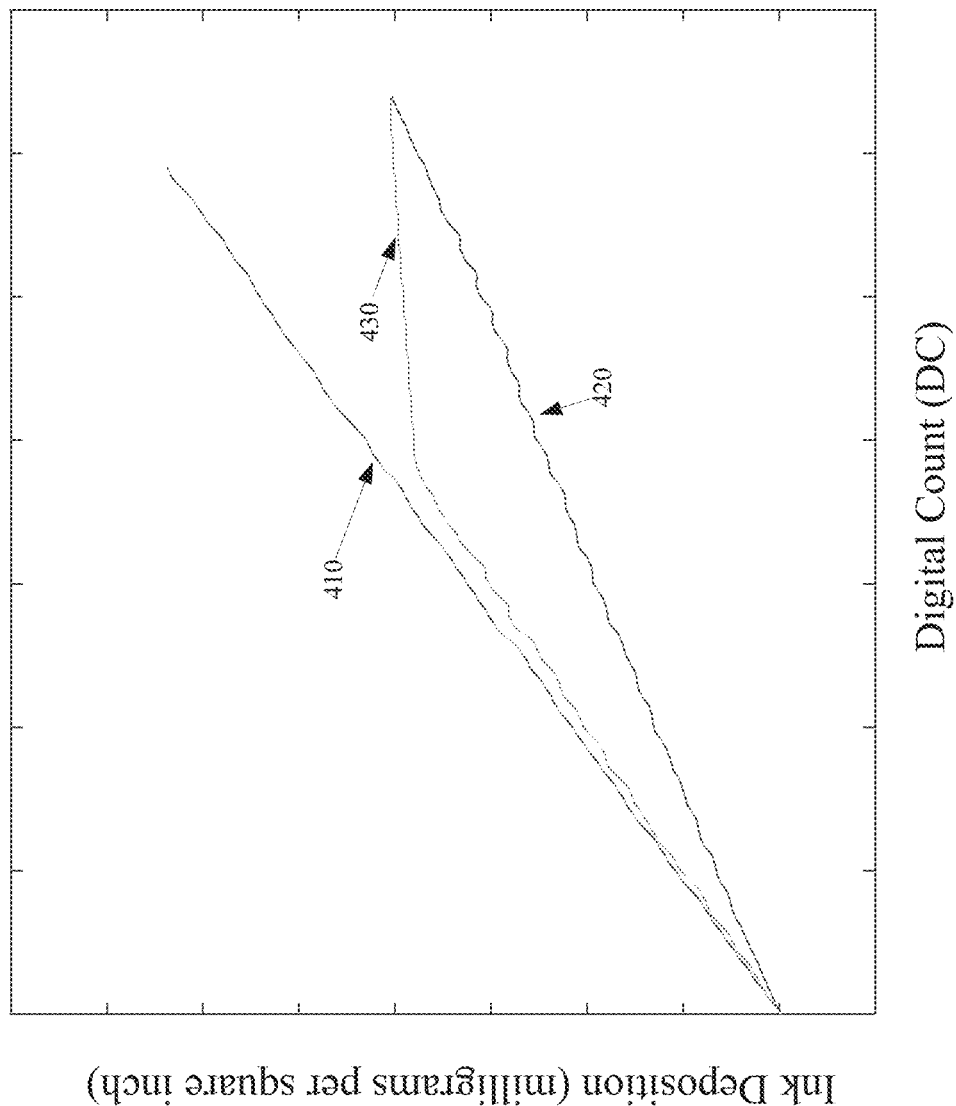
FIG. 4 is a graph illustrating ink deposition vs digital count without compensation.

A jet-out is a print defect (e.g., pel forming element artifact) caused by a completely blocked ink jet nozzle and the result is no ink deposited on the print medium when the blocked ink jet nozzle is instructed to fire. Other failure mechanisms may exist to cause a jet out that exhibit the same resulting lack of ejected drop. FIG. 3 is a graph illustrating simulated jet-out ink deposition without compensation. The graph shows ink deposition (e.g., ink volume or mass deposited within a unit area) versus the X direction position for any array of ink jet nozzles. A family of ink deposition curves is shown for different digital counts (DC). Since this is a simulation of a limited number of ink jet nozzles, some edge effects at the outer positions can be seen that are not of concern. The X direction is typically defined as across the print medium web (e.g., in the direction of the nozzles in the array, orthogonal to the direction of print medium travel) for a production printer. As shown in FIG. 3, an ink deposition deficiency ("valley" or "divot") is apparent at the x=0 position where a pel forming element 165 is not depositing ink. Similarly, FIG. 4 is a graph illustrating ink deposition vs digital count without compensation, and including lines 410, 420 and 430. These lines are evaluated at the same X position. Line 410 indicates a target ink deposition (e.g., ink deposition without a jet-out). Line 420 indicates ink deposition associated with a jet-out, while line 430 shows ink deposition for a conventional correction process applied to image data for adjacent pel forming elements 165

According to one embodiment, compensation module 216 is implemented to perform uniformity compensation to correct jet-outs at pel forming elements 165. In such an embodiment, compensation module 216 generates transfer functions for each of a plurality of color planes (e.g., CMYK) to compensate for non-functioning pel forming elements 165. As a result, the transfer functions are generated based on ink deposition functions (e.g., representations of ink volume or mass deposited in a unit area versus input digital count) for groups of pel forming elements including functioning pel forming elements and non-functioning pel forming elements.

In a further embodiment, compensation module 216 generates a first ink deposition function associated with a local group (IDLG) of pel forming elements 165 for each of a plurality of color planes, generates a second ink deposition function associated with the local group having one or more non-functioning pel forming elements 165 (IDLGJO) (e.g., attributed to jet-outs), generates a third ink deposition function associated with a non-local group (IDNILG) of pel forming elements 165 and generates the transfer functions for each of the plurality of color planes based on the first ink deposition function, the second ink deposition function and the third ink deposition function. Local group refers to a number of adjacent (e.g., neighboring) pel forming elements. Referring back to FIG. 3, the ink deposition curves represent the quantity IDNILG_C (x, DC)+IDLGJOC(x, DC) for different x and DC values.

In an alternative embodiment, compensation module 216 may generate compensated halftones 220. In such an embodiment, compensation module 216 generates compensated halftones 220 for each of the plurality of color planes based on an Inverse Transfer Function for each of the plurality of color planes derived from the first ink deposition function, the second ink deposition function and the third ink deposition function. In this case the derived Inverse Transfer Functions are used to transform (e.g., modify, compensate) the thresholds of a halftone threshold array, in the positional vicinity of the jet-out nozzle location.

In such an embodiment, the halftone thresholds (e.g., original halftone thresholds, unmodified halftone thresholds, uncompensated halftone thresholds) are modified by the inverse transfer functions such that the output ink amounts corresponding to modified halftone thresholds (e.g., compensated halftone thresholds) with the pel forming element artifacts and the output ink amounts corresponding to un-modified halftone thresholds without the pel forming element artifacts are substantially equal for a range of the input digital counts. In other words, the inverse transfer functions are generated such that when they are applied to modify the halftone thresholds, the output ink amounts corresponding to modified halftone thresholds with the pel forming element artifacts present and the output ink amounts corresponding to un-modified halftone thresholds without the pel forming element artifacts present are substantially equal for a range of the input digital counts.

Figure 5:
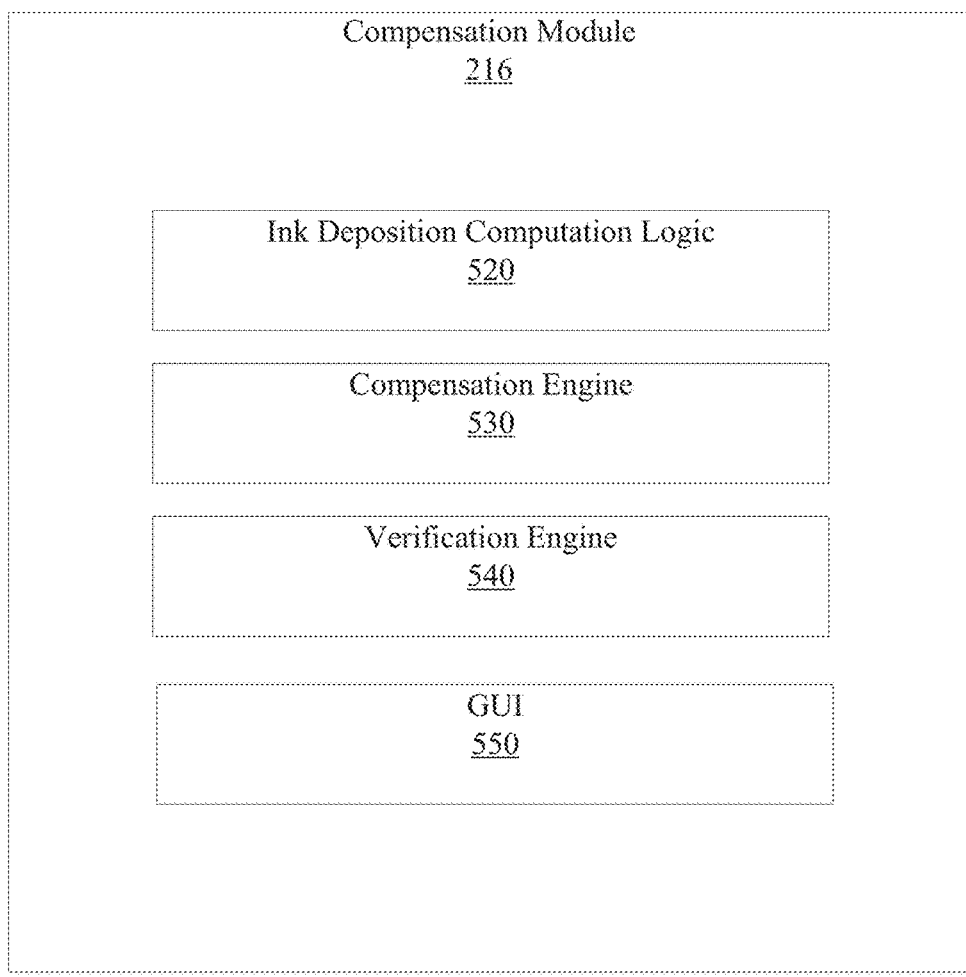
FIG. 5 illustrates one embodiment of a compensation module.
Figure 6:
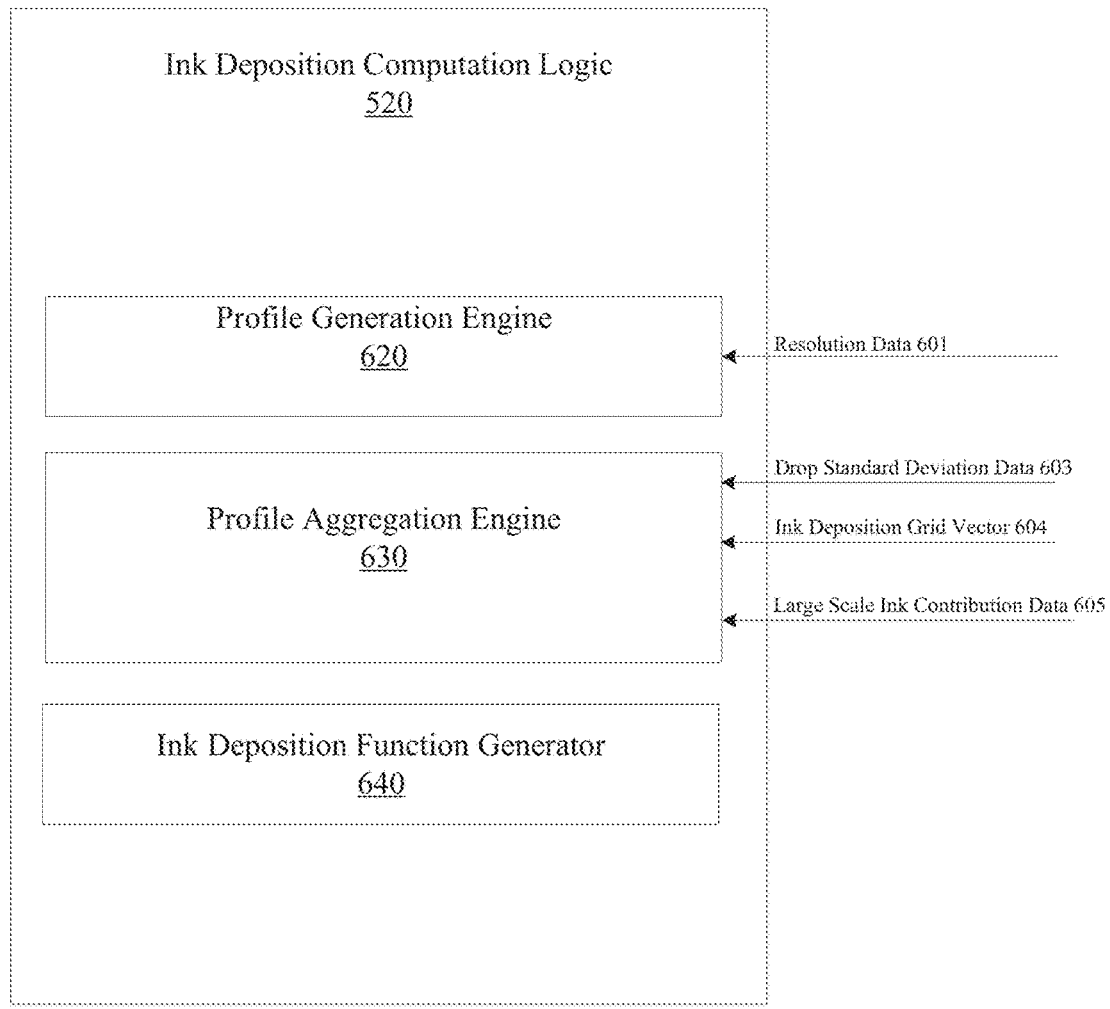
FIG. 6 illustrates one embodiment of ink deposition computation logic.

FIG. 5 illustrates one embodiment of compensation module 216. As shown in FIG. 5, compensation module 216 includes ink deposition computation logic 520. According to one embodiment, ink deposition computation logic 520 generates the IDLG, IDLGJO and IDNILG ink deposition functions based on a contone (or digital count (DC)). FIG. 6 illustrates one embodiment of ink deposition computation logic 520.

As shown in FIG. 6, ink deposition computation logic 520 includes profile generation engine 620, profile aggregation engine 630 and ink deposition function generator 640. Profile generation engine 620 generates Gaussian profiles associated with each ink deposition function. Gaussian profiles describe the ink deposition in the horizontal direction X along the ink jet array. As discussed above, ink deposition is separated into multiple components. Thus, profile aggregation engine 630 generates Gaussian profiles for the local group components IDLG and IDLGJO, which include Gaussian profiles that will be modified (e.g., via transfer function), as well as for IDNILG components that represent all Gaussian profiles that are not modified.

In a further embodiment, Gaussian profiles associated with the IDLG, IDLGJO and IDNILG groups of pel forming elements 165 are based on received data (e.g., via received via GUI 550). In this embodiment, the received data includes the number of pel forming elements 165, as well as resolution data 601 for printer 160 and/or pel forming elements 165. The resolution data 601 may be measured in dots per inch (DPI) in a direction (x) or as a physical spacing amount (e.g., the variable 's' as will be explained below), where the "x" dimension represents horizontal position for different columns (or pel forming elements 165) in the cross-web direction (e.g., along pel forming elements 165). The locations of the pel forming elements 165 may be represented as a printer grid.

The basis for the Gaussian profile model is the ink distribution for a single pel forming element 165. A Gaussian distribution is implemented to model how ink from a pel forming element 165 gradually spreads away from the center and provides a closed form expression for the ink deposition across the single pel forming element 165 for the ink applied to the media. In one embodiment, a one-dimensional Gaussian profile distribution of ink is implemented and the one dimension is the X direction. The Gaussian distribution concept is extended to match provided levels of large-scale ink deposition vs DC. Large-scale ink deposition is the amount of ink deposited in a unit area for an input digital count by an array of properly functioning pel forming elements (e.g., producing no artifacts). The result is a model that describes the micro level distributions of ink, created from macro level halftone ink deposition, where the micro level is provided by adding a Gaussian ink distribution description for a pel forming element 165.

For a single pel forming element 165, ink deposition on the media along the pel forming element 165 (or nozzle) array direction (e.g., X direction) can be described by the equation:

$$ID(x) = \text{Peak\_ink\_deposition\_single\_nozzle} * \exp^{-(x^2)/(2*a^2)},$$

Assuming for a single pel forming element 165 Peak_ink_deposition_single_nozzle is a function of DC. Where DC is digital count (e.g., gray level). This basically assumes that the ink deposition for different DC modulates the peak ink deposition of the Gaussian:

$$ID(x, DC) = \text{Peak\_ink\_deposition\_single\_nozzle}(DC) * \exp^{-(x^2)/(2*a^2)},$$

where x is distance in X direction, and a is the standard deviation of Gaussian distribution along the X direction.

The single pel forming element 165 model is extended to describe a collection of pel forming elements 165 from a printhead 162 array assuming seven nozzles are sufficient to add to obtain contributions from all of the individual elements at x equals zero (in this case seven pel forming elements are in the local group however the local group may be 2, 3, 4, 5, 6, 7, 8, 9 or more pel forming elements), where variable s is the spacing distance between nozzles in the X direction (e.g., variable s is the inverse of Dots Per Inch). The ink deposition functions are associated with a spacing amount for the non-functioning pel forming elements and the functioning pel forming elements. The ink deposition functions may then be expressed as:

$$\begin{aligned}IDarray(x,DC) = &\text{Peak\_ink\_deposition\_single\_nozzle}(DC)*\exp^{-(x^2)/(2*a^2)} \\&+ \text{Peak\_ink\_deposition\_single\_nozzle}(DC)*\exp^{-((x-s)^2)/(2*a^2)} \\&+ \text{Peak\_ink\_deposition\_single\_nozzle}(DC)*\exp^{-((x-(2*s))^2)/(2*a^2)} \\&+ \text{Peak\_ink\_deposition\_single\_nozzle}(DC)*\exp^{-((x-(3*s))^2)/(2*a^2)} \\&+ \text{Peak\_ink\_deposition\_single\_nozzle}(DC)*\exp^{-((x+s)^2)/(2*a^2)} \\&+ \text{Peak\_ink\_deposition\_single\_nozzle}(DC)*\exp^{-((x+(2*s))^2)/(2*a^2)} \\&+ \text{Peak\_ink\_deposition\_single\_nozzle}(DC)*\exp^{-((x+(3*s))^2)/(2*a^2)}\end{aligned}$$

Profile aggregation engine 630 aggregates the Gaussian profiles to generate local ink contribution data for each of the plurality of color planes. In one embodiment, profile aggregation engine 630 receives drop standard deviation data 603 for each color plane and ink deposition grid vector 604 (x locations where ink depositions are to be computed) and aggregates the Gaussian profiles by summing contributions of Gaussian profiles for each location x to generate the local ink contribution data for each of the plurality of color planes.

Profile aggregation engine 630 also receives large-scale ink contribution data 605 (e.g., the ink deposition versus DC curve (LID(DC))) for each color plane, which is used by profile aggregation engine 630 to combine the local ink contribution data and the large-scale ink contribution data to generate large-scale ink deposition data (ID(x,DC)) that matches the large-scale ink contribution data for each color plane for the point x=0 (LID(DC)=IDarray(0,DC)). Solving this equation for Peak_ink_deposition_single_nozzle(DC) at the point x=0 provides ink depositions that match the desired input 695 LID(DC). We now have a set of equations that describe the ink deposition at a micro level that have the same ink deposition as the provided large-scale ink deposition levels 605 as a function of DC.

$$\text{Peak\_ink\_deposition\_single\_nozzle}(DC) = LID(DC) / [\exp^{-(x^2)/(2 \cdot a^2)} +$$
$$\exp^{-((x-s)^2)/(2 \cdot a^2)} +$$
$$\exp^{-((x-(2 \cdot s))^2)/(2 \cdot a^2)} +$$
$$\exp^{-((x-(3 \cdot s))^2)/(2 \cdot a^2)} +$$
$$\exp^{-((x+s)^2)/(2 \cdot a^2)} +$$
$$\exp^{-((x+(2 \cdot s))^2)/(2 \cdot a^2)} +$$
$$\exp^{-((x+(3 \cdot s))^2)/(2 \cdot a^2)}]$$

This enables computing the ink depositions for the different groups that when combined equal the large-scale ink deposition LID(DC). Ink deposition function generator 640 uses the large-scale ink deposition data to generate ink deposition functions associated with the IDLG, IDLGJO and IDNILG groups (e.g., IDLG(x,DC), IDLGJO(x,DC), and IDNILG(x,DC)) for each color plane. Where IDLG is the ink deposition as a function of x for the pel forming elements 165 that will be considered for the analysis when a jet out is not present and where IDLGJO is the ink deposition as a function of x for the pel forming elements to be considered for analysis when a jet out is present and IDNILG is the ink deposition as a function of x for the pel forming elements that are outside of the domain of the elements to be considered. The pel forming elements that will be considered for analysis (e.g., the local group) are the elements that will receive compensation by transfer function (TF) modification and/or modification of the halftone threshold array.

Consider an example having three adjacent pel forming elements (e.g., local group has three elements) where the middle pel forming element will be assumed to be the jet out element. Using the previous equation, we solve for Peak_ink_deposition_single_nozzle(DC).

$$IDLG(x,DC) = \text{Peak\_ink\_deposition\_single\_nozzle}(DC) \cdot \exp^{-(x^2)/(2 \cdot a^2)} + \text{Peak\_ink\_deposition\_single\_nozzle}(DC) \cdot \exp^{-((x-s)^2)/(2 \cdot a^2)} + \text{Peak\_ink\_deposition\_single\_nozzle}(DC) \cdot \exp^{-((x+s)^2)/(2 \cdot a^2)}$$

Similarly for the jet out group the central element is not functioning therefore we can write:

$$IDLGJO(x,DC) = \text{Peak\_ink\_deposition\_single\_nozzle}(DC) \cdot \exp^{-((x-s)^2)/(2 \cdot a^2)} + \text{Peak\_ink\_deposition\_single\_nozzle}(DC) \cdot \exp^{-((x+s)^2)/(2 \cdot a^2)}$$

and finally the not-in-local group ink deposition consists of contributions from the four remaining elements surrounding the local group elements.

$$IDNILG(x,DC) = \text{Peak\_ink\_deposition\_single\_nozzle}(DC) \cdot \exp^{-((x-(2 \cdot s))^2)/(2 \cdot a^2)} + \text{Peak\_ink\_deposition\_single\_nozzle}(DC) \cdot \exp^{-((x-(3 \cdot s))^2)/(2 \cdot a^2)} + \text{Peak\_ink\_deposition\_single\_nozzle}(DC) \cdot \exp^{-((x+(2 \cdot s))^2)/(2 \cdot a^2)} + \text{Peak\_ink\_deposition\_single\_nozzle}(DC) \cdot \exp^{-((x+(3 \cdot s))^2)/(2 \cdot a^2)}$$

Similar sets of equations can be written for different cases for the number of pel forming elements which are functioning and jet out. The previous equations assume that seven total Gaussians are sufficient to account for the ink deposition contributions of all adjacent pel forming elements. This achieves the objective to match the large-scale ink deposition which is macro in nature. The number of elements in these equations can be increased or decreased if necessary to account for additional pel forming elements in the local group (LG) or not-in-local group (NILG).

Figure 7:
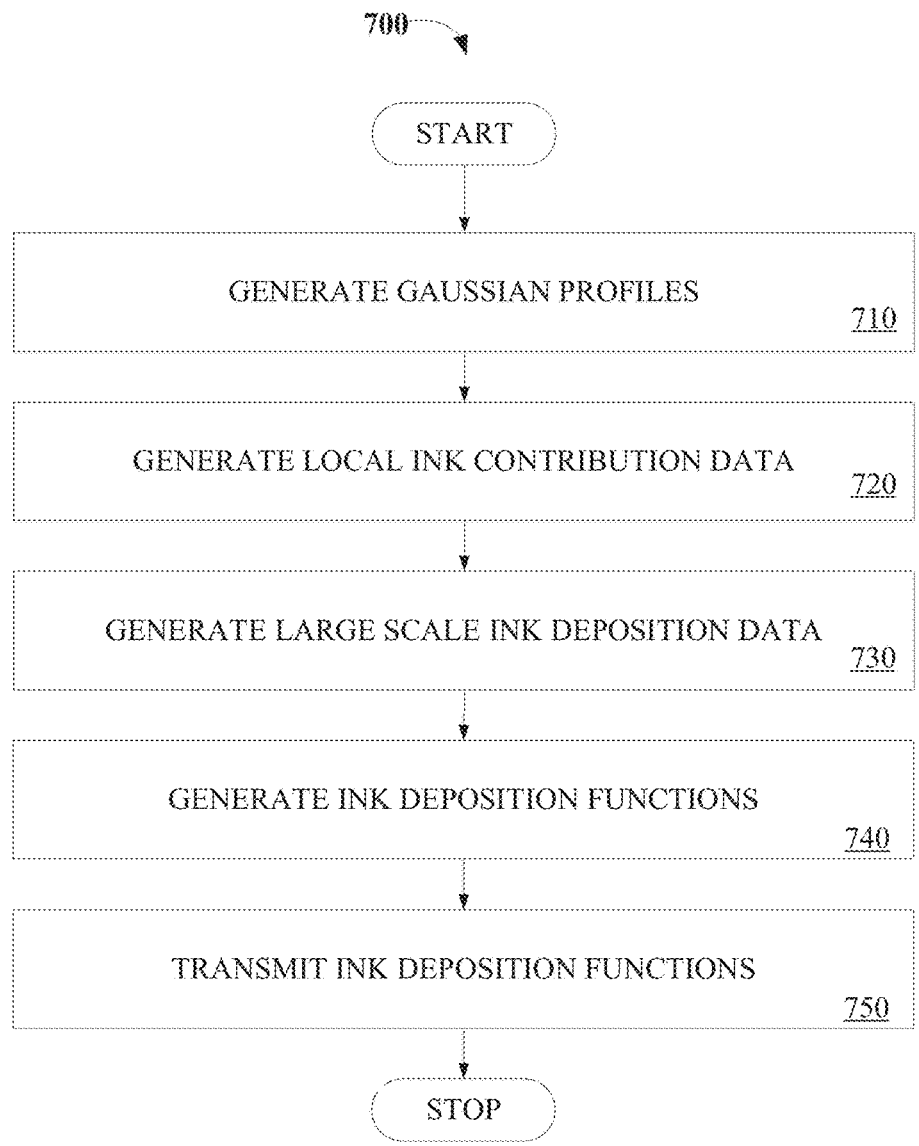
FIG. 7 is a flow diagram illustrating one embodiment of a process to compute ink deposition.

FIG. 7 is a flow diagram illustrating one embodiment of a process 700 to generate the ink deposition functions. Process 700 may be performed by processing logic that may include hardware (e.g., circuitry, dedicated logic, programmable logic, microcode, etc.), software such as instructions run on a processing device, or a combination thereof. In one embodiment, process 700 is performed by compensation module 216.

At processing block 710, each individual Gaussian profile associated with the IDLG, IDLGJO and IDNILG groups of pel forming elements are generated. At processing block 720, the Gaussian profiles are aggregated to generate the local ink contribution data without including the Peak_ink_deposition_single_nozzle(DC) factor (e.g., normalized). At processing block 730, the local ink contribution data is combined with the large-scale ink contribution data to generate the large-scale ink deposition data that matches the large-scale ink contribution data. At processing block 740 the ink deposition functions (IDLG, IDLGJO and IDNILG) are generated using the large-scale ink deposition data. At processing block 750, the ink deposition functions are transmitted.

Figure 8:
FIG. 8 illustrates one embodiment of a compensation engine.

Referring back to FIG. 5, compensation module 216 also includes a compensation engine 530 implemented to perform compensation based on the IDLG, IDLGJO and IDNILG ink deposition functions. FIG. 8 illustrates one embodiment of compensation engine 530. As shown in FIG. 8, compensation engine 530 includes transfer function generation engine 810 that is used to perform compensation by generating a transfer function (TF_C) for each color plane (e.g., TF_Cyan, TF_M, TF_Y, TF_K) based on the IDLG, IDLGJO and IDNILG ink deposition functions, such that:

$$IDtotal(x,DC) = IDNILG\_C(x,DC) + IDLG\_C(x,DC) = IDNILG\_C(x,DC) + IDLGJO\_C(x,TF\_C(DC)),$$

where IDNILG(x, DC) is the ID for the not in local group as a function of x and DC and the total ink deposition is IDtotal(x, DC).

Furthermore, we set IDtotal(0, DC)=LID(DC) to match the large-scale ink deposition for a given color ink. This results in:

$$LID(DC) = IDNILG\_C(0,DC) + IDLG\_C(0,DC) = IDNILG\_C(0,DC) + IDLGJO\_C(0,TF\_C(DC)),$$

which can be solved for TF_C(DC):

$$TF\_C(DC) = IDLGJO\_C^{-1}(LID(DC) - IDNILG\_C(0,DC)) = IDLGJO\_C^{-1}(IDLG\_C(0,DC)).$$

As a result, the transfer function TF(DC) for each color (TF_C) for the printhead jet-out location x=0 can be determined to obtain the desired target ID after TF compensation. In this case of x=0 the location x where compensation is achieved corresponds to the center of the jet out element. Solutions where x=$X_{offset}$ can also be determined where the desired result is to match ink deposition at a point displaced ($x_{offset}$=0) from the center of the jet out element. Such a point may produce a more balanced overshoot/undershoot of ink deposition levels in the vicinity of the jet out element. Similarly multiple $x_{offset}$ locations can be used and the TF solutions combined. The resulting ink deposition after compensation provides an improved match to the desired ID to account for the missing ink deposition from the jet out element.

In one embodiment, a transfer function comprises a mapping of an input digital count to an output digital count for a system, where digital count is the gray level or color value representing the pels in a bitmap. In a further embodiment, the transfer functions are generated using received input ink deposition X-direction location ($x_{offset}$) data 801. Ink deposition X-direction location data 801 indicates the one or more X-direction locations corresponding to the generated ink deposition functions and are associated with the corresponding generated transfer functions (or inverse transverse functions).

In the previous descriptions a value of x=0 was employed for the location to compute the ink deposition functions. Using an xoffset alternate location value to determine the ink deposition functions may provide a technical advantage of a more balanced overshoot/undershoot in the vicinity of the jet out. This may produce smaller variations that further improve the jet out compensation for a range of x positions. Furthermore, xoffset may have multiple locations defined. In this case the ink deposition is computed for each location and combined to produce a blended ink deposition (e.g., mean of multiple ink depositions). This again permits adjustment of the overshoot/undershoot to smooth the variations for different x locations. In the previous description the jetout was at x=0 and ink deposition was computed at x=0. In the new case the jetout is still at x=0, however ink deposition is computed at the xoffset location. The result is a TF that is derived based on the ink depositions at the xoffset location, instead of x=0.

Figure 9:
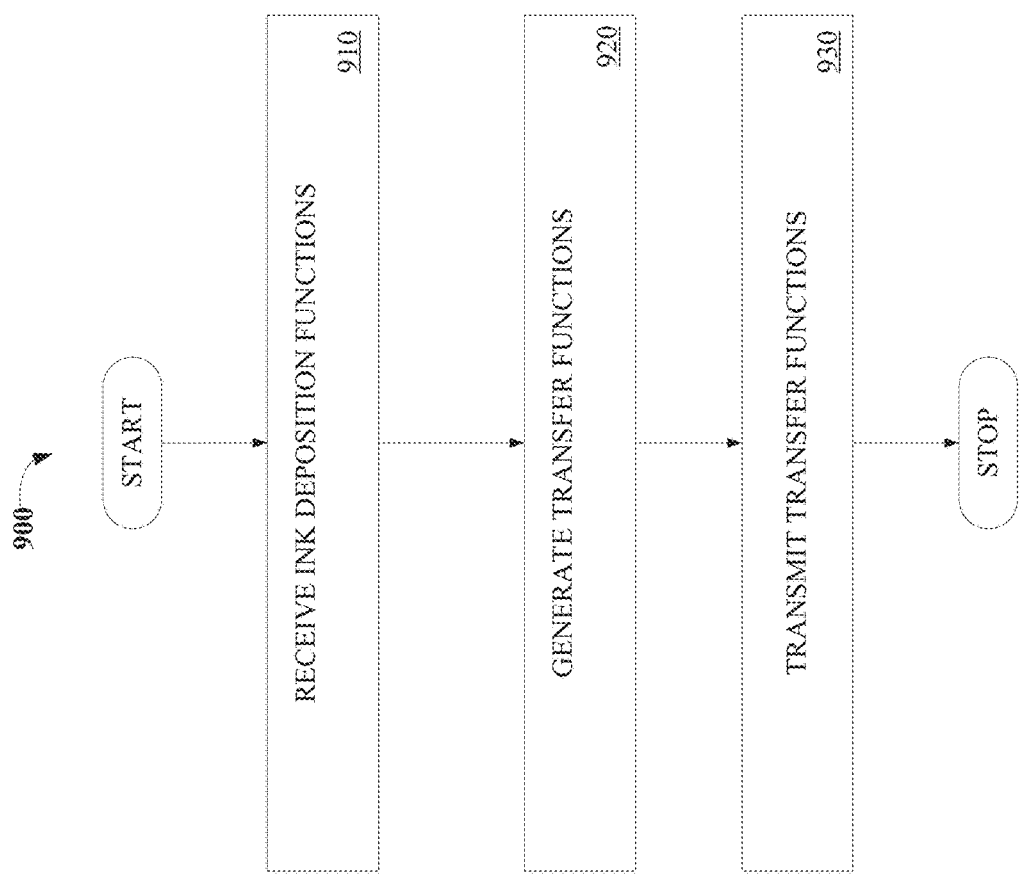
FIG. 9 is a flow diagram illustrating one embodiment of a process for generating transfer functions.

FIG. 9 is a flow diagram illustrating one embodiment of a process 900 for generating compensated transfer functions. Process 900 may be performed by processing logic that may include hardware (e.g., circuitry, dedicated logic, programmable logic, microcode, etc.), software such as instructions run on a processing device, or a combination thereof. In one embodiment, process 900 is performed by compensation module 216.

At processing block 910, ink deposition functions are received. At processing block 920, the transfer functions are generated based on the ink deposition functions. At processing block 930, the transfer functions are transmitted. Printer system 130 may receive the transfer functions and apply them either directly to the image data or cascade them with other transfer functions (e.g., uniformity transfer functions) before being applied to image data.

In an alternative embodiment, compensation engine 530 performs compensation by using halftone generation logic 820 (FIG. 8) to generate compensated halftones based on the IDLG, IDLGJO and IDNILG ink deposition functions. In such an embodiment, compensated halftones are generated for each color plane (e.g., HT_C, HT_M, HT_Y, HT_K) by modifying the thresholds in a received (e.g., un-compensated, original) halftone design at specific columns adjacent to the jet-out. Each modified column of the threshold array for all drop sizes is transformed using inverse transfer functions (ITF_C) generated for each color plane (e.g., ITF_Cyan, ITF_M, ITF_Y, ITF_K) in order to generate a compensated halftone design.

In a further embodiment, a received halftone design is implemented to generate the large-scale ink deposition data vs DC from which the ink deposition functions are derived. Inverse transfer function generation engine 815 generates inverse transfer functions that are used to generate compensated halftones. Pel forming elements 165 adjacent or close to defective nozzles are adjusted to compensate defective pel forming elements 165 in this way. According to one embodiment, the inverse transfer functions are applied to specific columns of the threshold arrays of un-compensated halftones to generate the compensated halftones. An inverse transfer function is the reversed (e.g., inverted) application of the transfer function, where the output digital count values of the transfer function form the input digital count values of the inverse transfer function (ITF) and the input digital count values of the transfer function form the output digital count values of the inverse transfer function. The inverse transfer functions may be generated based on a mathematical determination of the inverse function of the transfer functions. ITF may also be derived directly from the IDLG_C and IDLGJO_C functions as follows:

$$ITF\_C(DC)=TF\_C^{-1}(DC)=IDLG\_C^{-1}(IDLGJO\_C(0,DC))$$

Applying this to converting threshold values to create a halftone threshold array that contains the jet out compensation:

$$g\_output=ITF\_C(g\_input),$$

where g represents digital count threshold values. g_input is the initial threshold value from the un-compensated halftone and g_output is the compensated threshold array value for the compensation halftone. Each threshold for all drop sizes for the columns of the threshold array corresponding to the pel forming elements that will be corrected are converted in the same manner using the ITF.

Figure 10:
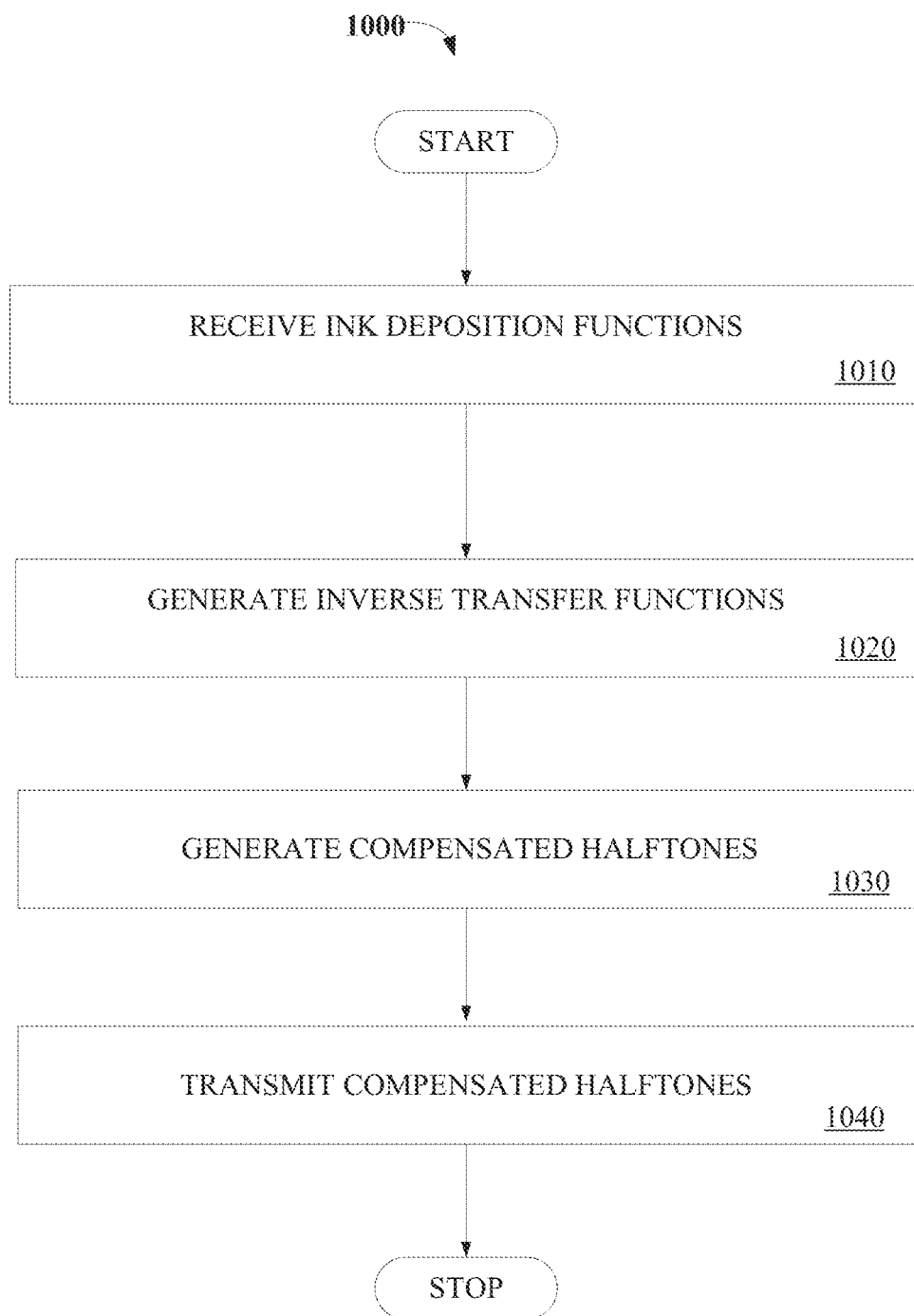
FIG. 10 is a flow diagram illustrating one embodiment of a process for generating compensated halftones.

FIG. 10 is a flow diagram illustrating one embodiment of a process 1000 for generating compensated halftones. Process 1000 may be performed by processing logic that may include hardware (e.g., circuitry, dedicated logic, programmable logic, microcode, etc.), software such as instructions run on a processing device, or a combination thereof. In one embodiment, process 1000 is performed by compensation module 216.

At processing block 1010, ink deposition functions are received. At processing block 1020, inverse transfer functions are generated (e.g., based on the transfer functions or based on the IDLG, IDLGJO and IDNILG ink deposition functions). At processing block 1030, the compensated halftones are generated. As discussed above, the compensated halftones are generated by applying the inverse transfer functions to specific columns of the un-compensated halftone (e.g., un-compensated threshold array) implemented to generate the compensated halftone threshold array. At processing block 1040, the compensated halftones (e.g., compensated halftone threshold arrays) are transmitted. Printer system 130 may receive the compensated halftones and apply them during the printing process.

Figure 11:
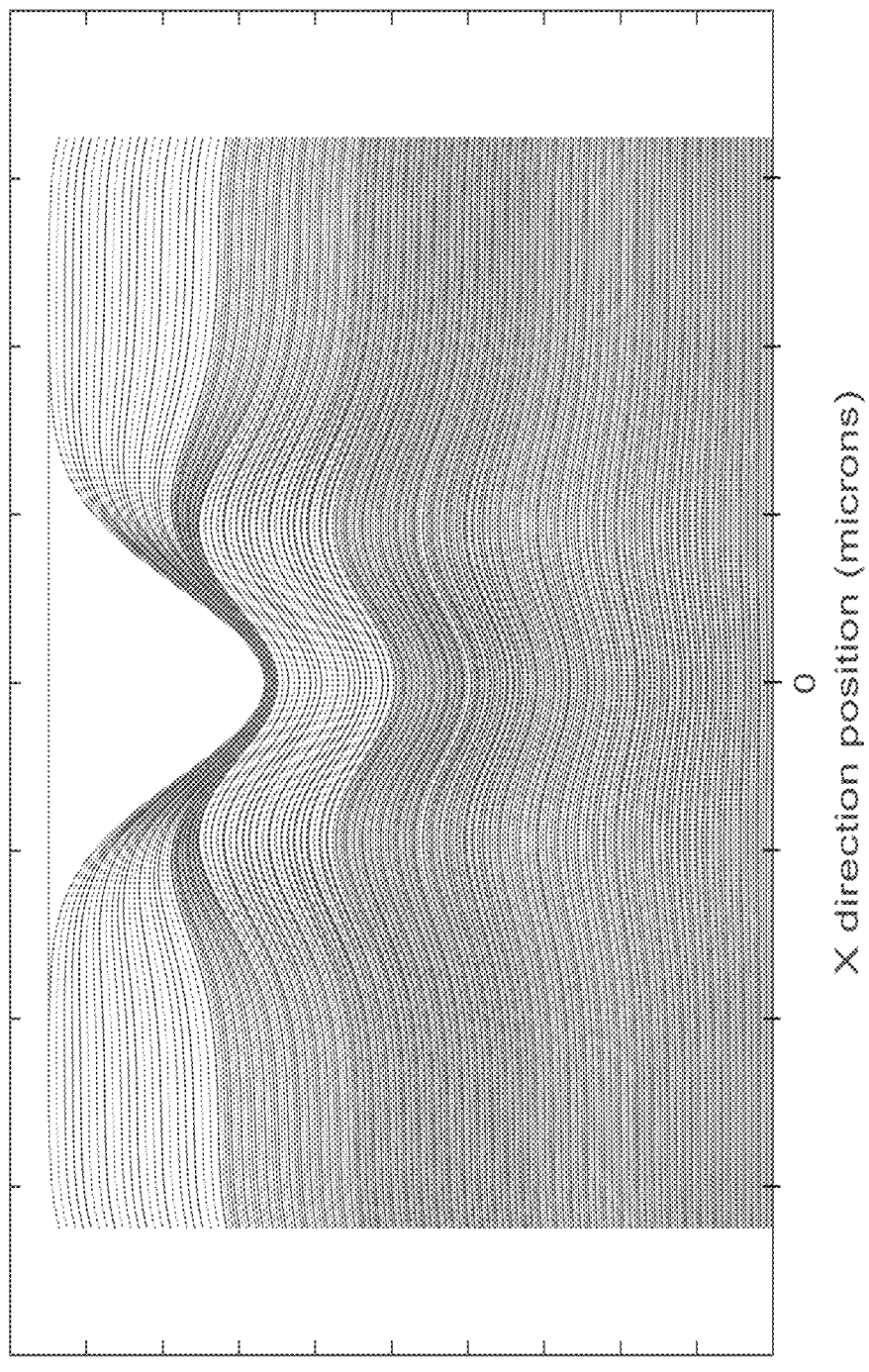
FIG. 11 is a graph illustrating jet-out ink deposition with compensation.

FIG. 11 is a graph illustrating jet-out ink deposition with applied compensation (e.g., transfer functions or compensated halftones). As shown in FIG. 11, the divot area has been corrected at the x=0 position, which is the center of the jet out pel element. The ink deposition curves represent the quantity IDNILG_C(x, DC)+IDLGJO_C(x, TF_C(DC)) for different x and DC values using the TF that we have determined. Comparing the compensated jet out ink depositions in FIG. 11 to the uncompensated jet out ink depositions in FIG. 3, we can see that in the area near position x=0 (e.g., the location of the jet out pel forming element) the family of ink deposition curves are flatter in FIG. 11 than in FIG. 3. This flatness is indicative of the degree of uniformity of the measure printed output. Furthermore, at x=0 the level of ink deposition in FIG. 11 has been increased for each DC level to match the deposition outside the jet out region (e.g., steady state ink deposition on the far right and far left).

Figure 12:
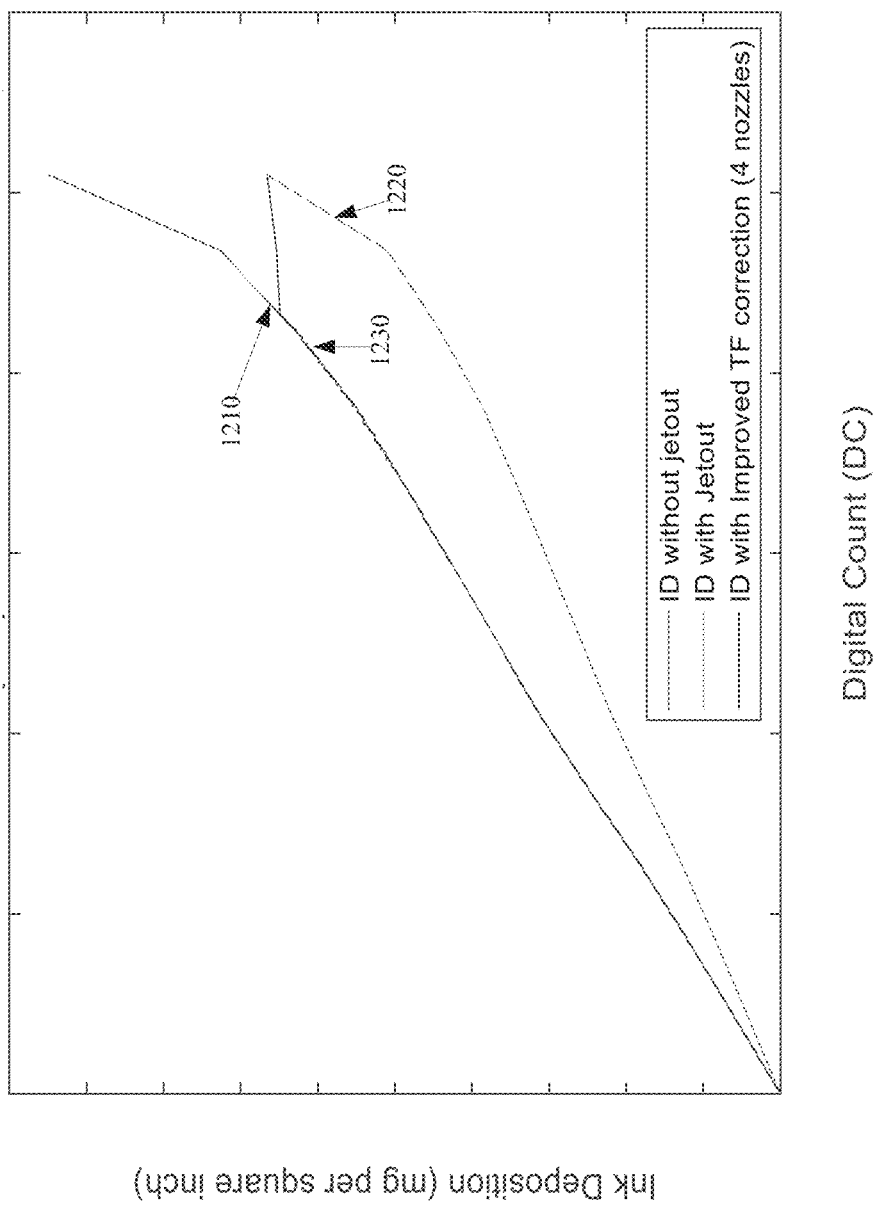
FIG. 12 is a graph illustrating ink deposition vs digital count with jet-out compensation.
Figure 13:
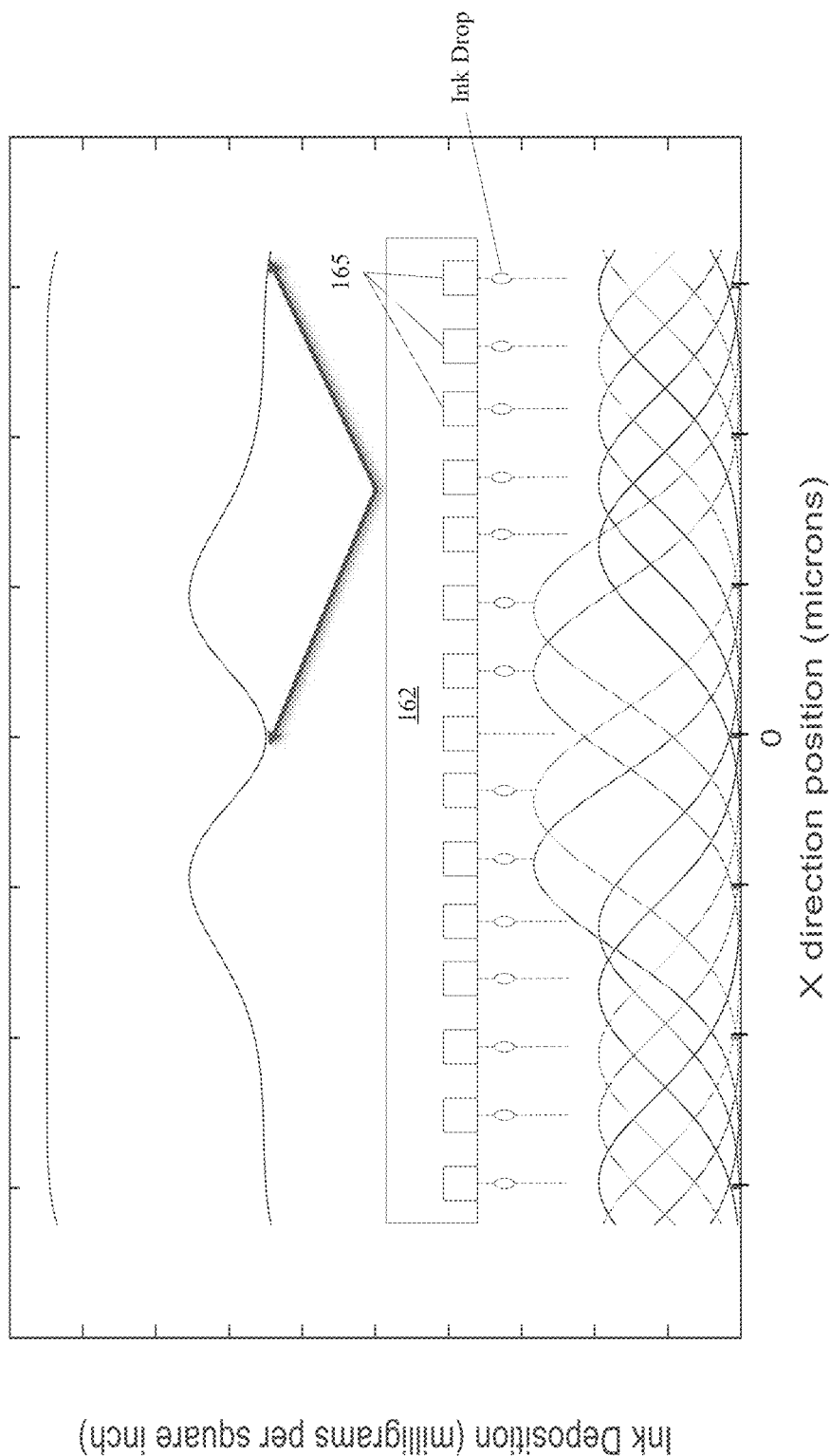
FIG. 13 is a graph illustrating ink deposition Gaussian profiles with jet-out compensation.

Additionally, FIG. 12 is a graph illustrating ink deposition vs digital count with jet-out compensation. Line 1210 indicates the target ink deposition, while line 1220 indicates ink deposition associated with a jet-out. Line 1230 shows ink deposition corrected via transfer functions (or compensated halftones) generated according to the above-described compensation process. As shown in FIG. 12, the compensated ink deposition (e.g., line 1230) matches the target ink deposition (e.g., line 1210) up to a threshold digital count level, at which point compensation may not be achieved FIG. 13 illustrates one embodiment of a compensation of columns of threshold data relative to the location of a jet-out/deviated-jet nozzle. FIG. 13 shows a print head 162 including pel forming elements 165 that each generate ink drops, where each pel forming element is associated with a Gaussian profile ink distribution curve. In this example a jet-out is located at the middle of the plotted data (e.g., position x=0), the corresponding pel forming element 165 ejects no ink drop and the corresponding ink distribution is zero. Four Gaussians have been boosted, two on each side of jet-out, to compensate for the missing ink deposition created by the jet-out artifact. The level applied to these four compensated nozzles at each DC is obtained from the transfer functions generated from the ink deposition functions.

The curve in the middle shows the total ink deposition from all of the Gaussians at DC level 217. The curve illustrates that the boosted output of four nozzles provided an increased ink deposition so that the level in the "valley" at the jet out location is equal to the ink deposition outside the jet-out region (e.g., near the edges). The curve at the top shows the ink deposition that occurs at DC level 255 without the jet-out. Without the jet-out compensation the set of Gaussians will all be the same and there will not be any boosted nozzle outputs.

Referring back to FIG. 5, a verification engine 540 is also included within compensation module 216. Verification engine 540 applies compensation data to each of the color planes to generate compensated ink deposition functions (e.g., ID_C, ID_M, ID_Y, ID_K). In one embodiment, verification engine 540 applies the generated transfer functions to the large-scale ink deposition data (e.g., generated at profile aggregation engine 630) to generate the compensated ink deposition functions. However, in an alternative embodiment, verification engine 540 employs the compensated halftones as compensation data to generate the compensated ink deposition functions. In this embodiment, the compensated halftones are generated using the inverse transfer functions and the ink depositions computed for each column of the threshold array. This provides a means to verify TF compensated or halftone compensated artifacts.

Figure 14:
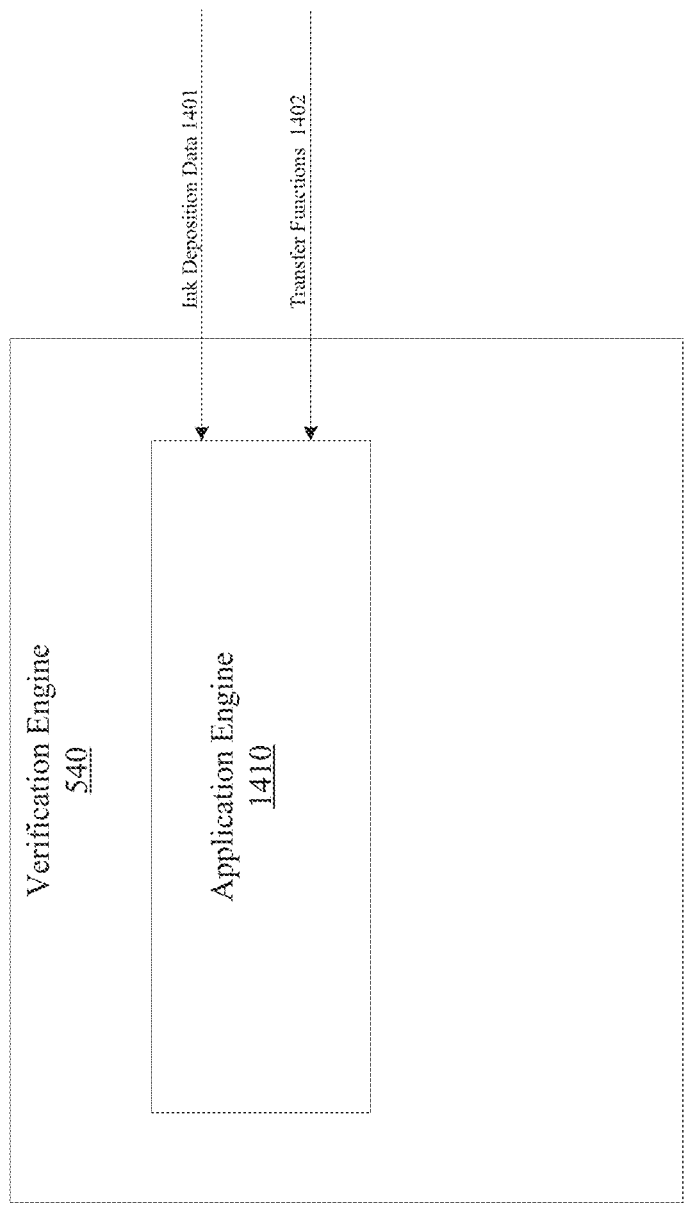
FIG. 14 illustrates one embodiment of a verification engine.

FIG. 14 illustrates one embodiment of verification engine 540, which includes an application engine 1410 to apply compensation data. As shown in FIG. 14, application engine 1410 receives large-scale ink deposition data 1401 and transfer functions 1402. In one embodiment, the generated transfer functions 1402 are received and applied to the ink deposition data with jet out (IDLGJO_C) 1401 to generate a compensation ink deposition function. In this embodiment, the compensation ink deposition function corresponds to the IDLGJO ink deposition function.

According to one embodiment, application engine 1410 compares the compensation ink deposition function to the IDLGJO ink deposition function to determine a difference and to LID. In such an embodiment, application engine 1410 verifies whether a difference between the compensation deposition function and the IDLGJO and LID ink deposition function is within a predetermined threshold (e.g., as defined by a value received via GUI 550). In a further embodiment, application engine 1410 validates an acceptable compensation upon determining that the difference is within the predetermined threshold. FIG. 12 is an example showing ink depositions determined by the compensation verification.

Figure 15:
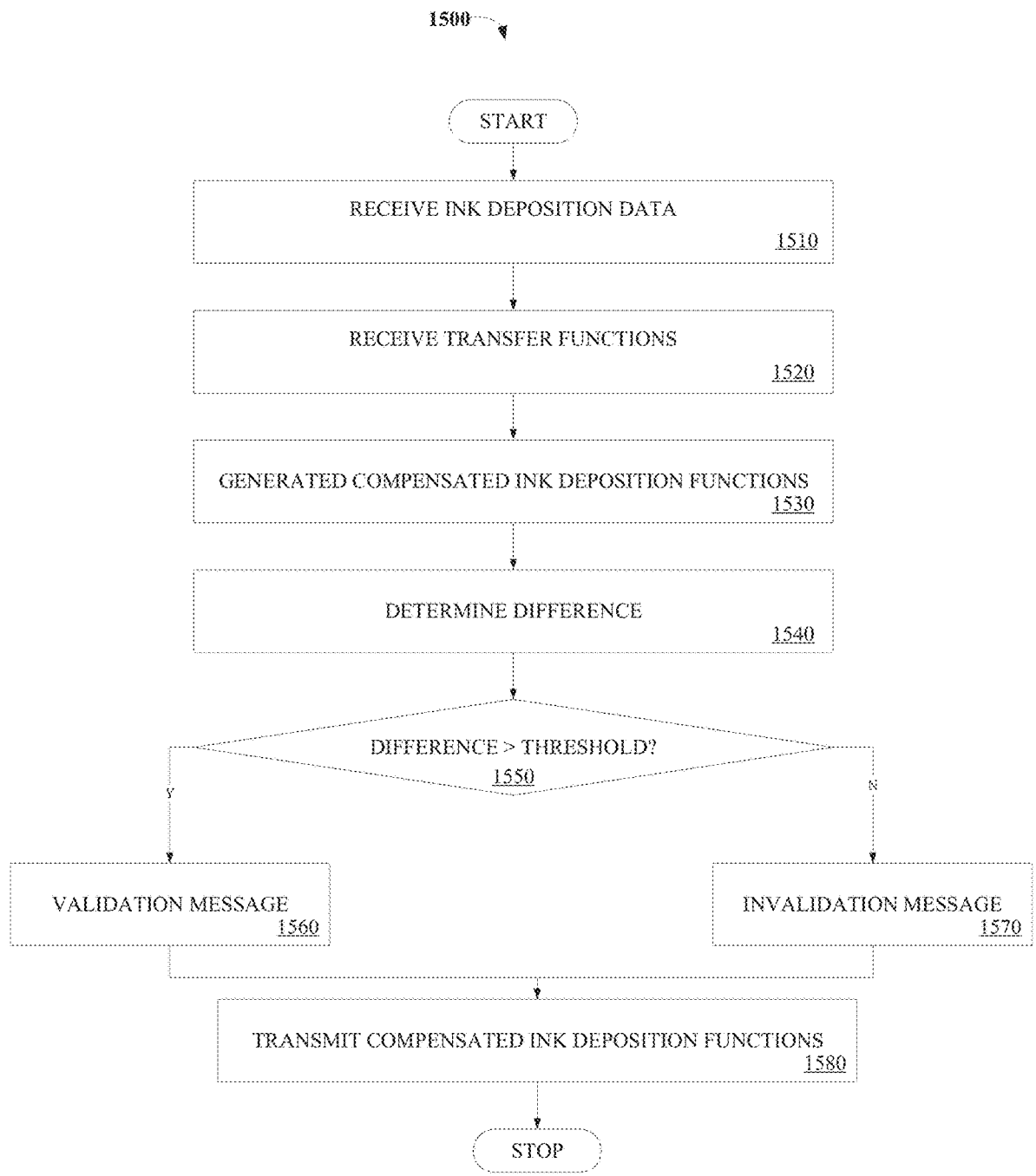
FIG. 15 is a flow diagram illustrating one embodiment of a verification process.

FIG. 15 is a flow diagram illustrating one embodiment of a verification process 1500 using transfer functions. Process 1500 may be performed by processing logic that may include hardware (e.g., circuitry, dedicated logic, programmable logic, microcode, etc.), software such as instructions run on a processing device, or a combination thereof. In one embodiment, process 1500 is performed by compensation module 216.

At processing block 1510, the large-scale ink deposition data 1401 is received and IDLGJO and IDNILG. At processing block 1520, the generated transfer functions 1402 are received. At processing block 1530, the transfer functions 1402 are applied to the IDLGJO ink deposition data 1401 to generate the compensated ink deposition function. At processing block 1540, a difference between the compensated ink deposition function and the IDLGJO and LID ink deposition functions are determined. Comparing compensated results to LID indicates how close the match is and over what specific range of DC levels. Comparing to IDLGJO allows one to quantify how much modification of ink deposition has occurred.

At decision block 1550, a determination is made as to whether the difference is greater than the threshold. If so, a validation message is generated indicating that the compensation has been validated as acceptable, processing block 1560. Otherwise, an invalidation message is generated indicating that the compensation has been invalidated as unacceptable, processing block 1570. At processing block 1580, the compensated ink deposition function as well as an associated message (e.g., validation or invalidation message) is transmitted.

Printhead Overlap

Figure 16A:
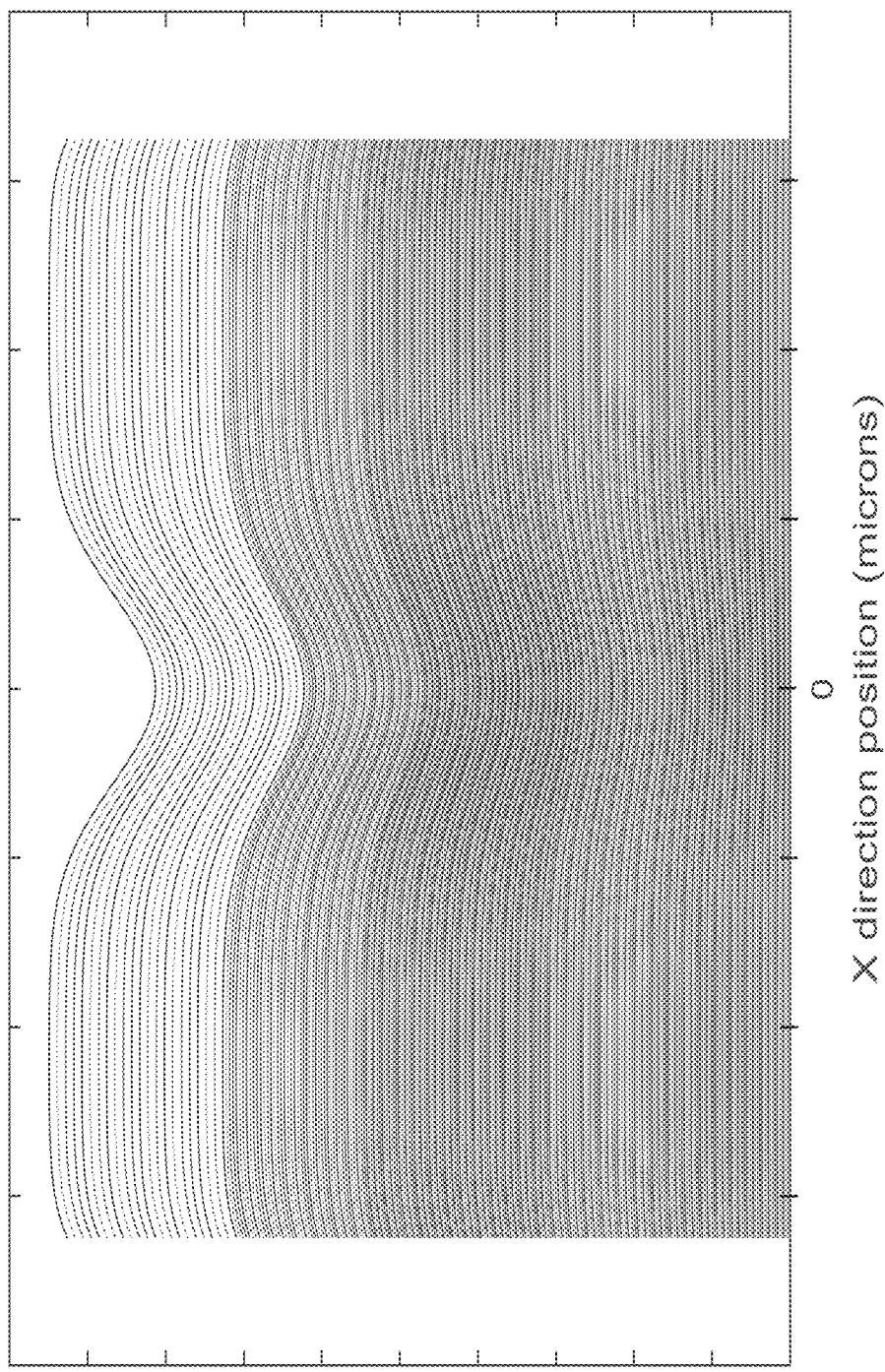
FIG. 16A&B are graphs illustrating printhead overlap ink deposition without compensation.
Figure 16B:
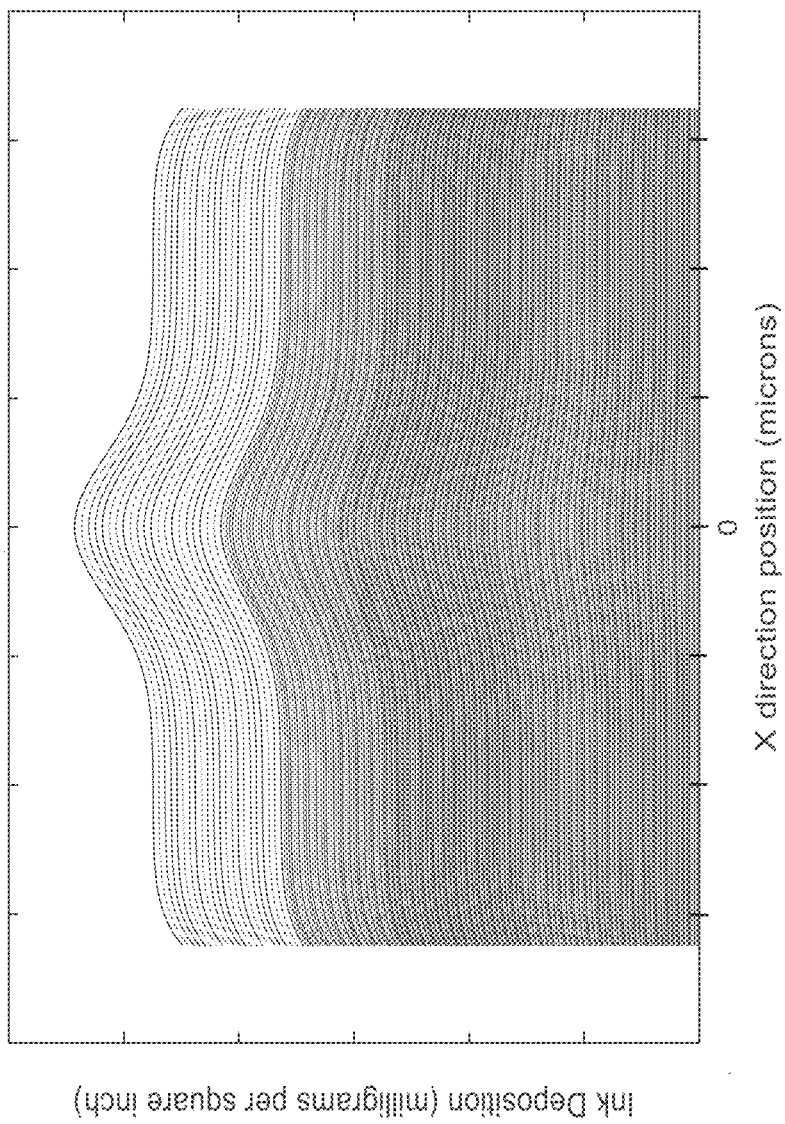

A discussed above, compensation module 216 may also be implemented to perform compensation for pel forming elements attributed to printhead overlap. Printhead overlap results from an incorrectly spaced gap between adjoining printheads 162. This incorrect overlap may occur during manufacturing of the printer, after replacement of a printhead or some other physical change of the printhead. For example, FIGS. 16A&16B illustrate printhead overlap ink deposition scenarios without compensation. FIG. 16A illustrates overlap ink deposition in which adjacent printheads 162 are too far apart (e.g., negative overlap). As shown in FIG. 16A, an ink deposition deficiency is apparent at the x=0 position where pel forming elements 165 from different printheads 162 are too far apart.

FIG. 16B illustrates overlap ink deposition in which adjacent printheads 162 are too close together (e.g., positive overlap). In this instance there is excess ink deposition at the x=0 position due to the pel forming elements 165 from different printheads 162 being too close. In these cases, the point x=0 is the mid-point between the last pel forming element of one printhead and the first pel forming element of a different printhead. All other pel forming elements in each of the two printheads are at their nominal spacings (e.g., nominal nozzle to nozzle spacing).

Figure 17:
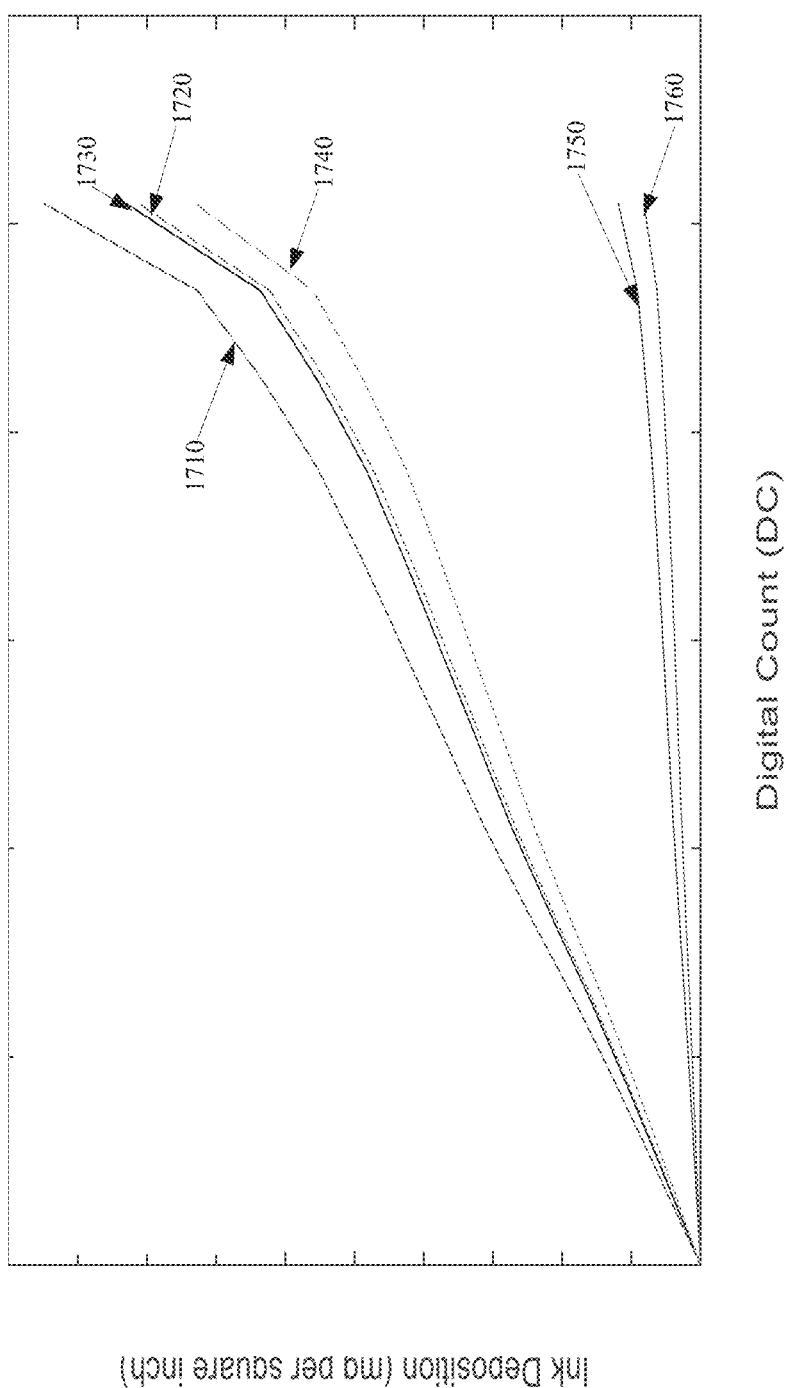
FIG. 17 is a graph illustrating ink deposition vs digital count without printhead overlap compensation.

FIG. 17 is a graph illustrating ink deposition vs digital count without printhead overlap compensation. FIG. 17 shows lines 1710, 1720, 1730, 1740, 1750 and 1760. Line 1710 indicates ink deposition without overlap for all pel forming elements 165, while line 1720 indicates ink deposition with overlap for all pel forming elements 165. Line 1730 indicates ink deposition without overlap for pel forming elements 165 in a local group, while line 1740 indicates ink deposition with overlap for pel forming elements 165 in a local group. Similarly, line 1750 indicates ink deposition without overlap for pel forming elements 165 not in a local group, while line 1760 indicates ink deposition with overlap for pel forming elements 165 not in a local group.

Overlap refers to the physical distance amount (e.g., gap) between the last pel forming element of one printhead and the first pel forming elements of the second adjacent printhead, which in this case is larger than the nominal pel to pel element spacing within the printheads. Overlap can apply to the case where the last and first pel forming elements have spacing greater than or less than the nominal ideal pel to pel element spacing. Note that in this case the not in local group ink depositions are different for the cases with and without overlap, which is different than what occurs when jet out depositions are determined. This occurs due to the fact that the overlap has an impact on the not in local group ink deposition when an overlap is present.

Figure 18:
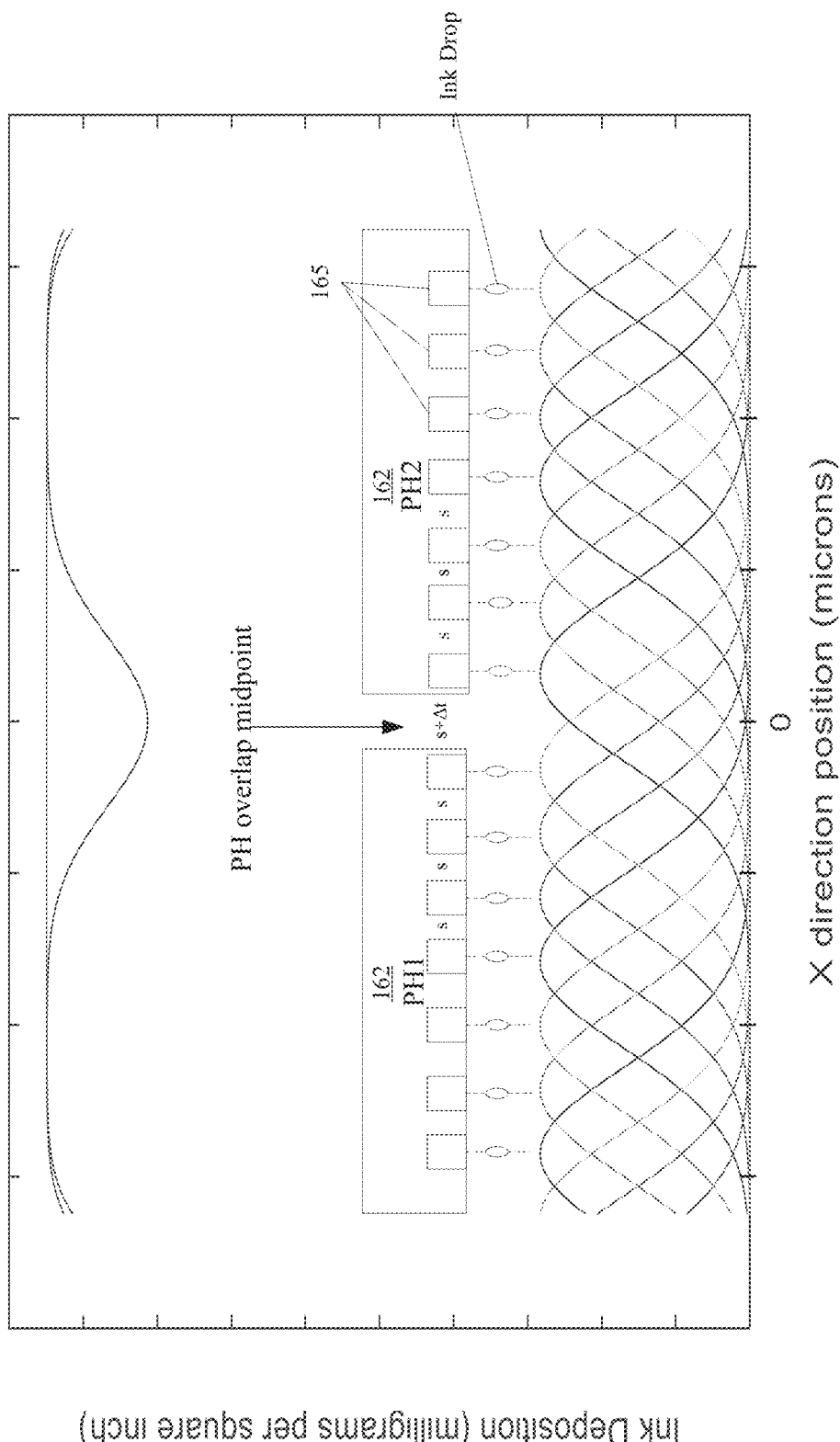
FIG. 18 is a graph illustrating ink deposition without printhead overlap compensation.

Additionally, FIG. 18 is a graph illustrating printhead overlap ink deposition without compensation (e.g., overlap compensation) for adjacent printheads 162 (PH1 and PH2) where the midpoint between pel forming elements for the two printheads is defined to be at x=0 and the printheads are too far apart. The top line is the large-scale ink deposition. The middle line shows the total ink deposition with the valley corresponding to the gap between the two printheads. The family of curves at the bottom show the Gaussian profile ink distribution for each of the ink jet nozzles, where each Gaussian is associated with a pel forming element 165. Each of the printheads 162 (PH1 and PH2) comprise pel forming elements 165 that are physically spaced apart a distance s (e.g., nominal spacing for pel forming elements 165) in the X direction. The physical distance amount between the outer pel forming element 165 of PH1 and the adjacent outer pel forming element PH2 is s plus delta t (e.g., $\Delta t$). In this case delta t is positive indicating that the two printheads are too far apart.

According to one embodiment, compensation module 216 is implemented to perform uniformity compensation to correct overlapping pel forming elements 165 at adjacent printheads 162. Similar to the discussion above with reference to jet-out compensation, compensation module 216 also generates transfer functions for each of a plurality of color planes (e.g., CMYK) to compensate for overlapping pel forming elements 165. As a result, the transfer functions are generated based on ink deposition functions for groups of pel forming elements including overlapping pel forming elements and non-overlapping pel forming elements.

In this embodiment, compensation module 216 generates a first ink deposition function associated with a local group (IDLG) of pel forming elements 165 for each of a plurality of color planes, generates a second ink deposition function associated with the local group having one or more overlapping pel forming elements 165 (e.g., attributed to printhead overlap) (IDLGOL), generates a third ink deposition function associated with a non-local group (IDNILG) of pel forming elements 165, generates a fourth ink deposition function associated with the non-local group having one or more overlapping pel forming elements 165 (IDNILGOL) and generates the transfer functions for each of the plurality of color planes based on the first ink deposition function, the second ink deposition function, the third ink deposition function and the fourth ink deposition function. In this case local group refers to the pel forming elements that will be used for the compensation. This for example might include a single pel at the ends of two adjacent printheads or two pel forming elements at the end of each printhead, etc. Gaussians have a one-to-one correspondence to each pel element.

In an alternative embodiment, compensation module 216 may generate compensated halftones 220. In such an embodiment, compensation module 216 generates compensated halftones 220 for each of the plurality of color planes based on the inverse transfer function for each of the plurality of color planes derived from the first ink deposition function, the second ink deposition function, the third ink deposition function and the fourth ink deposition function. Similar to the discussion above, the halftone thresholds are modified by the inverse transfer functions such that the output ink amounts corresponding to modified halftone thresholds with the pel forming element artifacts and the output ink amounts corresponding to un-modified halftone thresholds without the pel forming element artifacts are substantially equal for a range of the input digital counts.

According to one embodiment, the ink deposition computation logic 520 shown in FIG. 6 is also implemented to generate the IDLG, IDLGOL, IDNILG and IDNILGOL ink deposition functions. For example, profile generation engine 620 generates Gaussian profiles associated with the IDLG, IDLGOL, IDNILG and IDNILGOL groups of pel forming elements 165 based on the number of pel forming elements 165, resolution data 601 and standard deviations for the Gaussian profiles. According to this embodiment, resolution data 601 also includes printhead overlap data (e.g., delta t) associated with the overlap of the printheads. Delta t may be pre-determined (e.g., based on physical measurements of adjacent printheads in a printhead array). The ink deposition function is obtained by summing the Gaussian ink depositions for each case.

Assuming the local group consists of two total pel forming elements, one from the ends of two different adjacent printheads. IDLG is obtained by summing the Gaussian ink depositions assuming the two Gaussians have a their nominal pel to pel spacing. IDLGOL is obtained by summing two Gaussians that have a delta t added to the spacing between the pel forming elements. In other words, the position of the two Gaussians on the printer grid reflects the printhead overlap delta t. The ink deposition functions may be expressed mathematically in a form similar to the ink deposition equations noted above by accounting for delta t on the Gaussian position. The ink deposition functions are associated with a spacing amount for the overlapping pel forming elements and the non-overlapping pel forming elements and an overlap amount (e.g., delta t).

IDNILG is obtained by summing all the Gaussian ink deposition functions that are not included in the local group which would be all the Gaussians not including the two Gaussians at the edges of the two adjacent printheads assuming nominal spacing of all pel forming elements. IDNILGOL is obtained by summing all the Gaussian ink deposition functions that are not included in the local group, which would be all the Gaussians not including the two Gaussians at the edges of the two adjacent printheads but still accounting for delta t in spacing for the two elements on the ends of the printheads. In addition, in this case all of the elements not in the local group are assumed to be located at the nominal pel to pel spacing. The ink depositions for the four functions are determined for a range of x direction points forming a grid, including the midpoint at x=0. The grid must include at least the point where the compensation TF is determined.

Similarly, profile aggregation engine 630 aggregates the Gaussian profiles to generate local ink contribution data for each of the plurality of color planes by summing contributions of Gaussian profiles for all points x in the grid to generate the local ink contribution data for each of the plurality of color planes, while ink deposition function generator 640 uses the large-scale ink deposition data to generate ink deposition functions associated with the IDLG, IDLGOL, IDNILG and IDNILGOL groups (e.g., IDLG (x,DC), IDLGOL (x,DC), IDNILG (x,DC) and IDNILGOL (x,DC)) for each color plane. As a result, the same process to generate the ink deposition functions discussed above with reference to FIG. 7 is performed to generate and transmit the ink deposition functions for the printhead overlap embodiment. The large-scale ink deposition LID (DC) must equal the sum of the ink depositions IDLG(x,DC) and IDNILG(x,DC) at the position x=0. This allows the determination of a scaling factor to be applied to each Gaussian ink depositions so that the large-scale ink deposition vs DC is achieved.

Compensation engine 530 also performs compensation attributed to printhead overlap based on the IDLG, IDLGOL, IDNILG and IDNILGOL ink deposition functions, such that:

$$IDtotal(x,DC)=IDNILG(x,DC)+IDLG(x,DC)=IDLGOL(x,TF(DC))+IDNILGOL(x,DC),$$

where, IDNILG(x, DC) is the ID for the not in local group, without the overlap; IDNILGOL(x, DC) is the ID for the not in local group, with the overlap; IDLG(x, DC) is the target ID for the local group after TF correction, without the overlap; IDLGOL(x, TF(DC)) is the ID in the local group with overlap and TF compensation applied; and the total ink deposition is IDtotal(x, DC).

Additionally, IDtotal(0,DC)=LID(DC) at the point x=0 which is the large-scale ink deposition vs DC function:

$$TF(DC)=IDLGOL^{-1}(IDNILG(0,DC)+IDLG(0,DC)-IDNILGOL(0,DC))$$

$$TF(DC)=IDLGOL^{-1}(LID(DC)-IDNILGOL(0,DC))$$

The ITF used to correct the halftone threshold array then is:

$$ITF(DC)=(LID(DC)-IDNILGOL(0,DC))^{-1}(IDLGOL(0,DC)),$$

where=$(LID(DC)-IDNILGOL(0,DC))^{-1}$ is the inverse function of the difference between functions LID(DC) and IDNILGOL(0,DC) at x=0
As a result, the transfer function TF(DC) at the PH overlap location x=0 can be determined to obtain the corrected ID after TF compensation.

In an alternative embodiment, compensation engine 530 performs compensation by using halftone generation logic 820 to generate compensated halftones based on the IDLG, IDLGOL, IDNILG and IDNILGOL ink deposition functions. As discussed above, the compensated halftones are generated for each color plane by modifying the thresholds in an un-compensated halftone design at specific columns adjacent to the overlap region (e.g., single pel at the end of each printhead in the case where two pels are compensated). In one embodiment, the transfer function and halftone compensation processes are performed via processes similar to those discussed above with reference to FIG. 9 and FIG. 10, respectively.

Figure 19A:
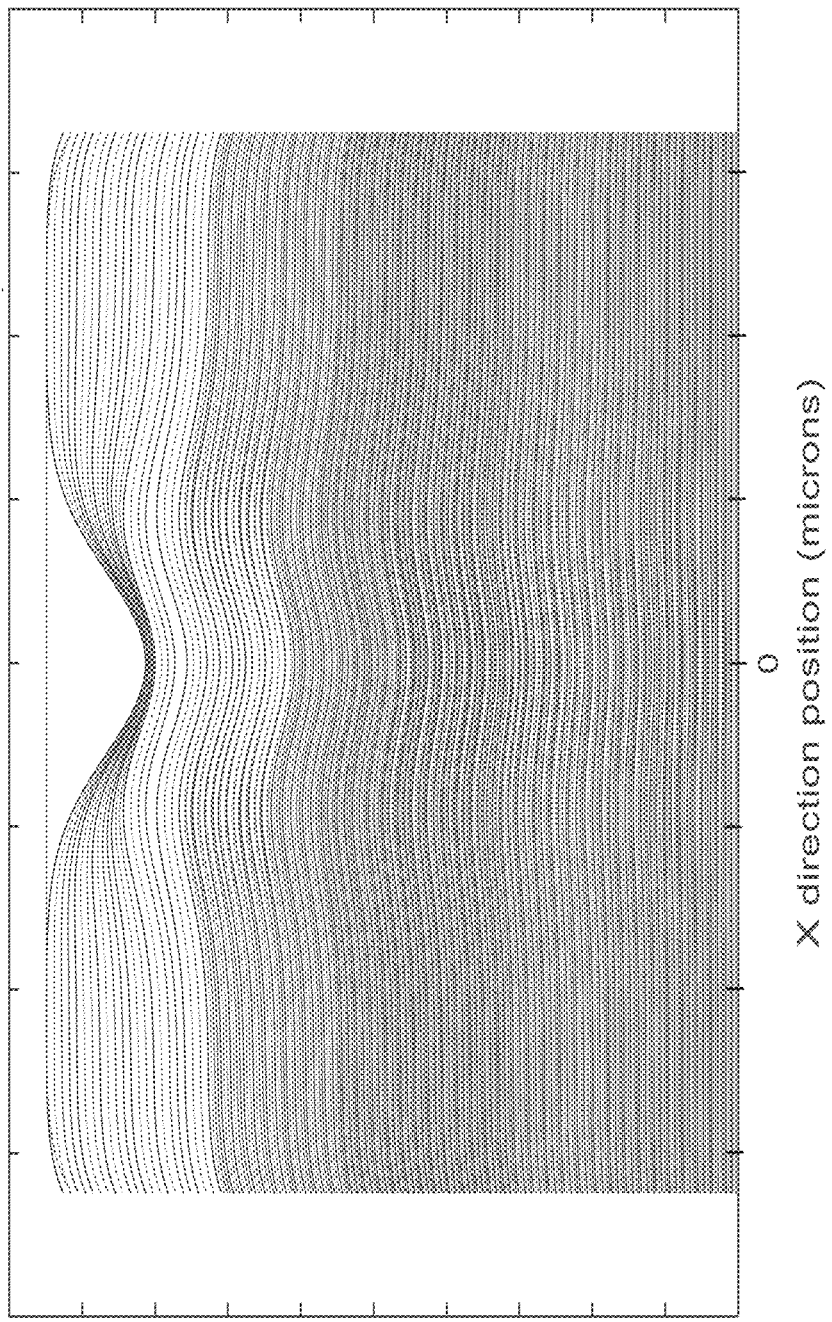
FIGS. 19A&B are graphs illustrating ink deposition with printhead overlap compensation.
Figure 19B:
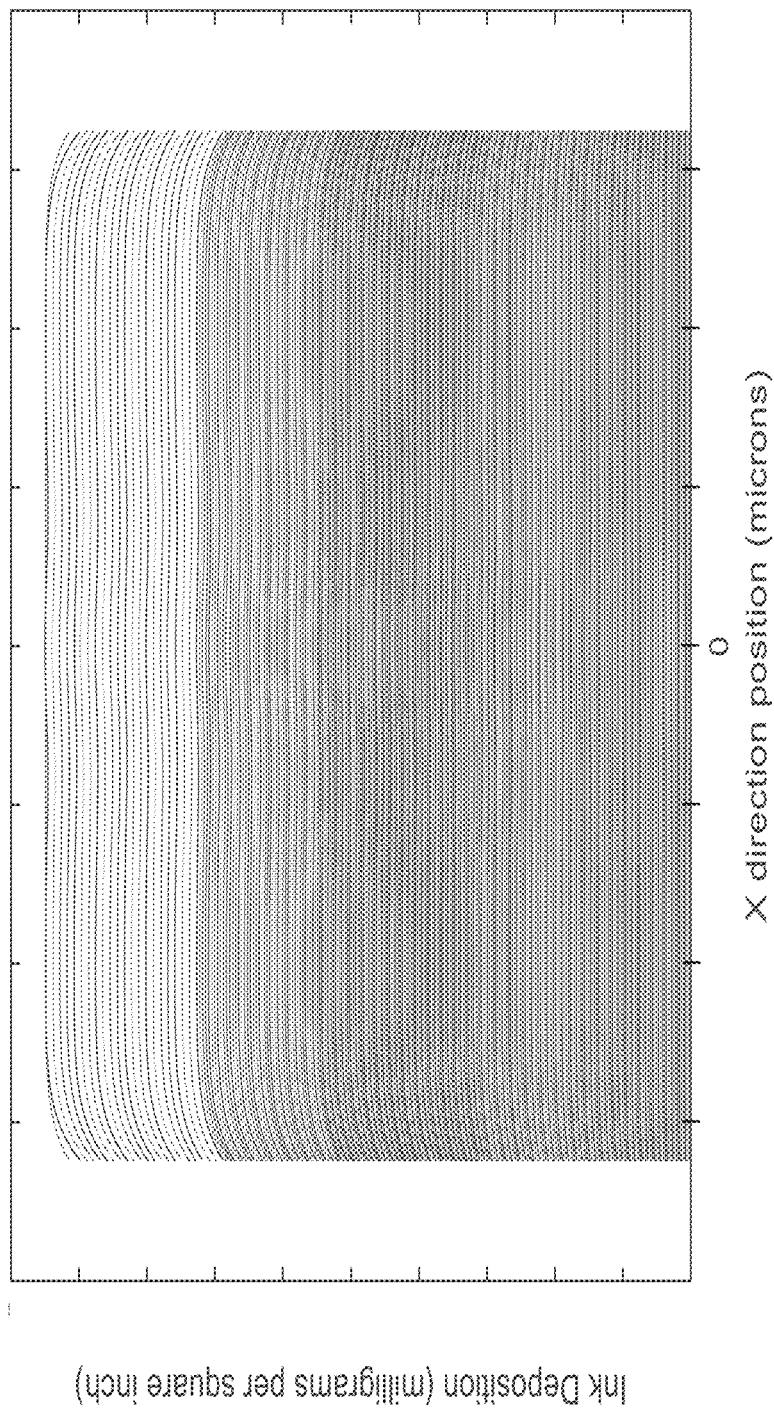

FIGS. 19A&19B are graphs illustrating compensation of pel forming elements 165 attributed to printhead overlap. FIG. 19A illustrates ink deposition overlap compensation for the scenario in which adjacent printheads 162 are too far apart. As shown in FIG. 19A, the divot area has been altered at position x=0, as compared to shown in FIG. 16A. The ink deposition at x=0 has been boosted to match the ink deposition for regions where the spacing between pel forming elements are nominal. FIG. 19B illustrates compensation for the scenario in which adjacent printheads 162 are too close together (e.g., delta t is negative). As shown in FIG. 19B, the excess ink deposition at position x=0 has been effectively eliminated, as compared to shown in FIG. 16B.

Figure 20:
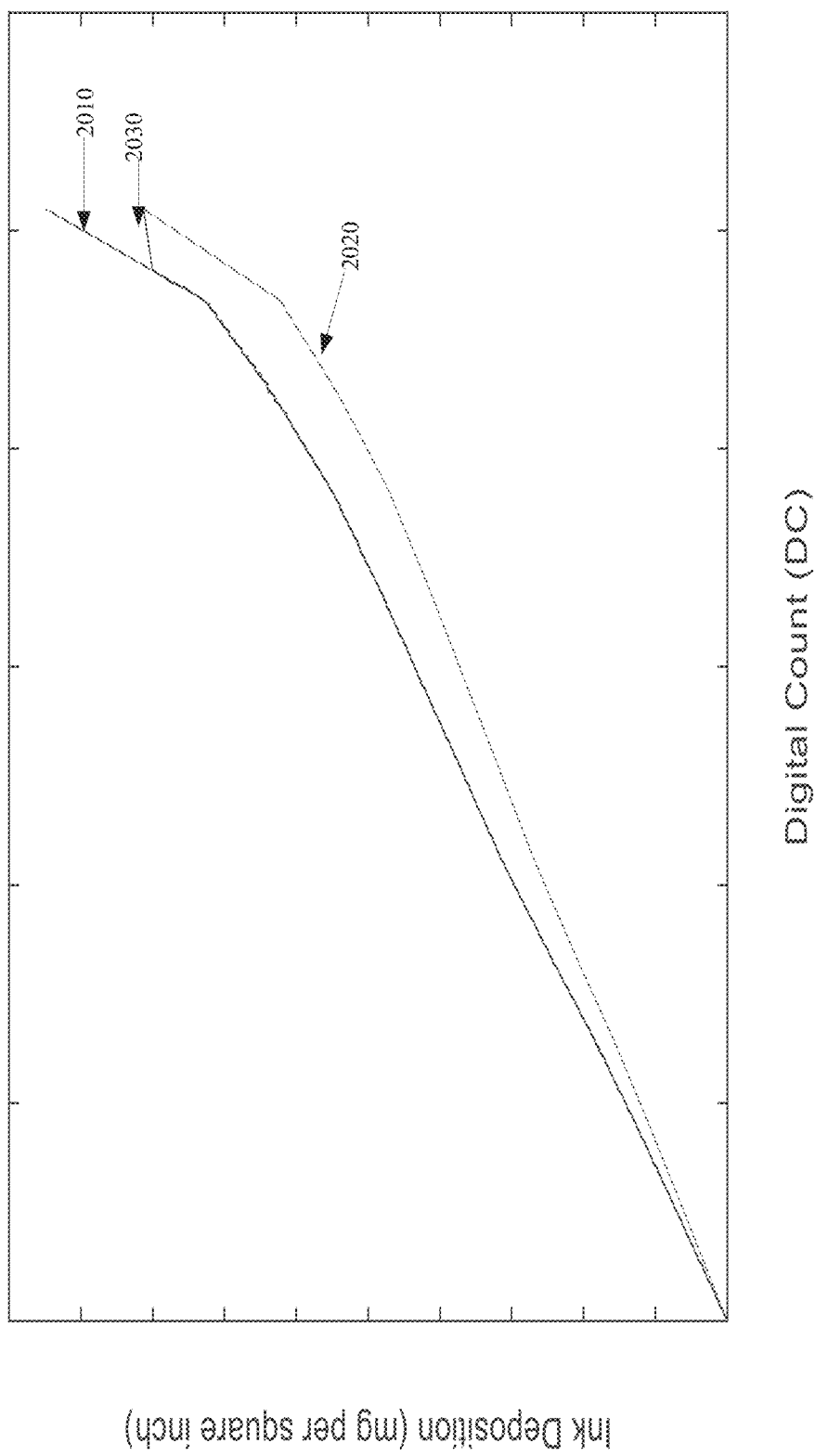
FIG. 20 is a graph illustrating ink deposition vs digital count with printhead overlap compensation.

FIG. 20 is a graph illustrating ink deposition vs digital count with printhead overlap compensation. FIG. 20 shows lines 2010, 2020 and 2030. Line 2010 indicates the target ink deposition without overlap for all pel forming elements 165, while line 2020 indicates measured ink deposition with printhead overlap. Line 2030 indicates ink deposition with overlap compensation. As shown, the compensated ink deposition matches the target ink deposition up to a threshold digital count level.

Figure 21:
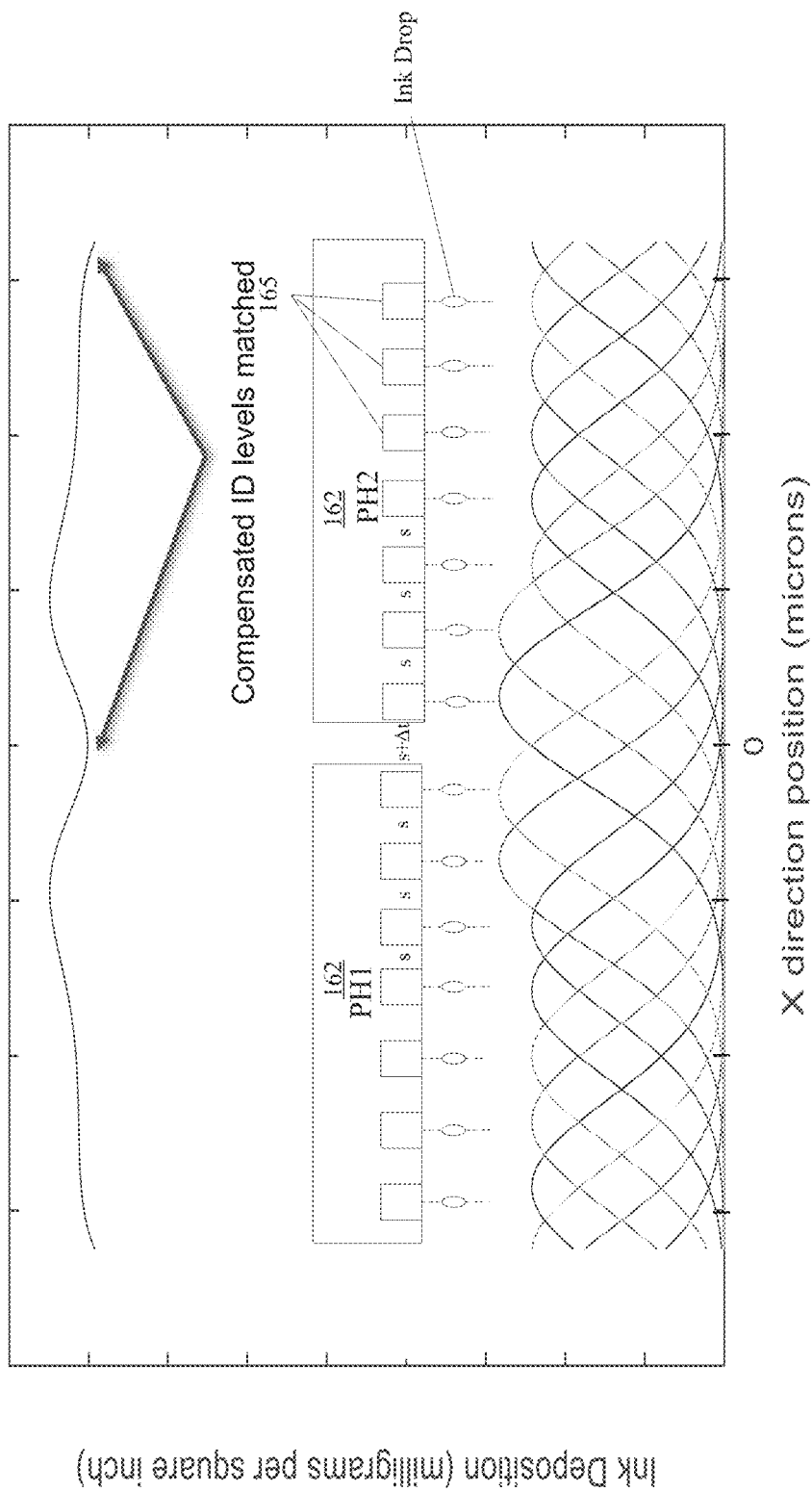
FIG. 21 is a graph illustrating ink deposition with printhead overlap compensation.

FIG. 21 illustrates one embodiment of a compensation of columns of threshold data relative to the location of an overlap of pel forming elements 165 between two adjacent printheads 162 (e.g., PH1 and PH2). In this example the midpoint between two pel forming elements at the edges of two adjacent printheads is located at the middle of the plotted data (e.g., position x=0). Four Gaussian profiles have been boosted, two on each side of the midpoint, to compensate for the missing ink deposition (e.g., the valley) created by the overlap (e.g., printheads too far apart). The level applied to these four compensated nozzles at each DC is obtained from the transfer functions generated from the ink deposition functions. The curve at the top shows the total ink deposition from all of the Gaussian profiles at DC level 242. The curve illustrates that the boosted output from four nozzles provided an increased ink deposition so that the level in the "valley" at the jet out location is equal to the ink deposition outside the jet-out region (e.g., near the edges). Without the jet-out compensation the set of Gaussians will all be the same and there will not be a boost.

According to one embodiment, verification engine 540 applies compensation data to each of the color planes to generate compensated ink deposition functions (e.g., ID3_C, ID3_M, ID3_Y, ID3_K). In this embodiment, verification engine 340 applies the generated transfer functions to the ink deposition functions data to generate a compensated ink deposition function that is compared to the large-scale ink deposition LID(DC). This basically is a test to verify that when the computed TF(DC) is used in the following expression we achieved IDtotal(x,DC) that matches LID(DC). ID3_C(DC)=IDLGOL(0,TF(DC))+IDNILGOL(0, DC) for each color C. Furthermore, variations in ink deposition for different positions x in the vicinity of the overlap can be determined using the equation IDtotal(x,DC)=IDLGOL(x, TF(DC))+IDNILGOL(x, DC) with the computed TF used.

As discussed above, application engine 1410 compares the compensation ink deposition function to the IDLGOL ink deposition function to determine a difference and verify whether the difference between the compensation deposition function and the ID3 ink deposition function is within a predetermined threshold when compared to LID(DC). In a further embodiment, application engine 1410 validates an acceptable compensation upon determining that the difference is within the predetermined threshold.

Figure 22:
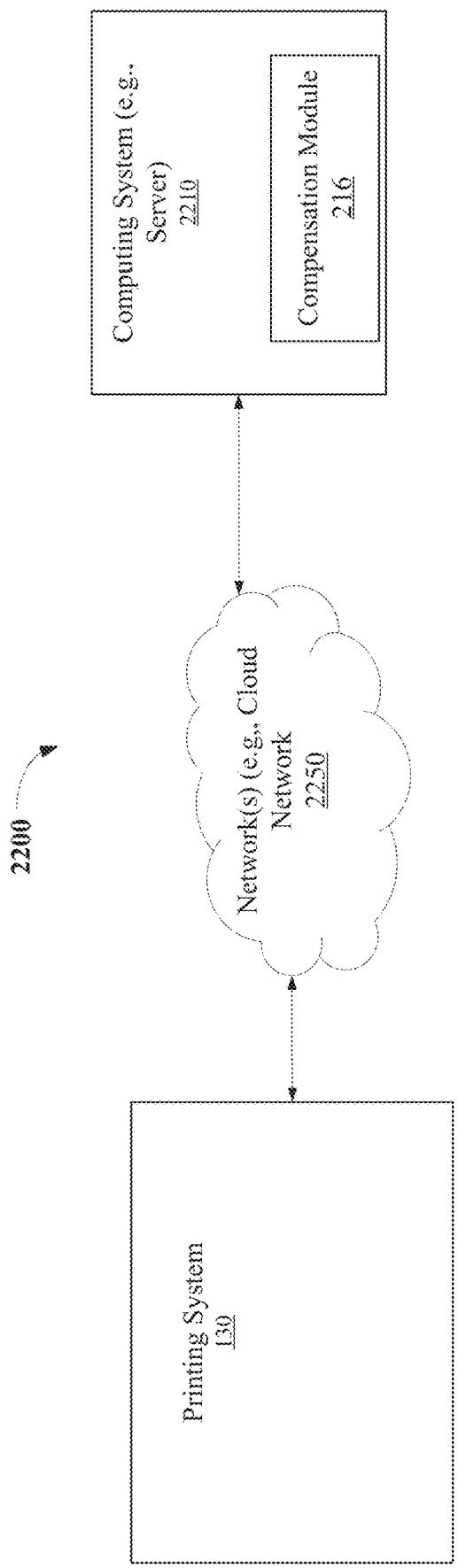
FIG. 22 illustrates one embodiment of a compensation module implemented in a network.

Although shown as a component of print controller 140, other embodiments may feature compensation module 216 included within an independent device, or combination of devices, communicably coupled to print controller 140. For instance, FIG. 22 illustrates one embodiment of a compensation module 216 implemented in a network 2200. As shown in FIG. 22, compensation module 216 is included within a computing system 2210 and transmits compensated halftones and/or transfer functions to printing system 130 via a cloud network 2250. Printing system 130 receives compensated halftones and/or transfer functions.

Figure 23:
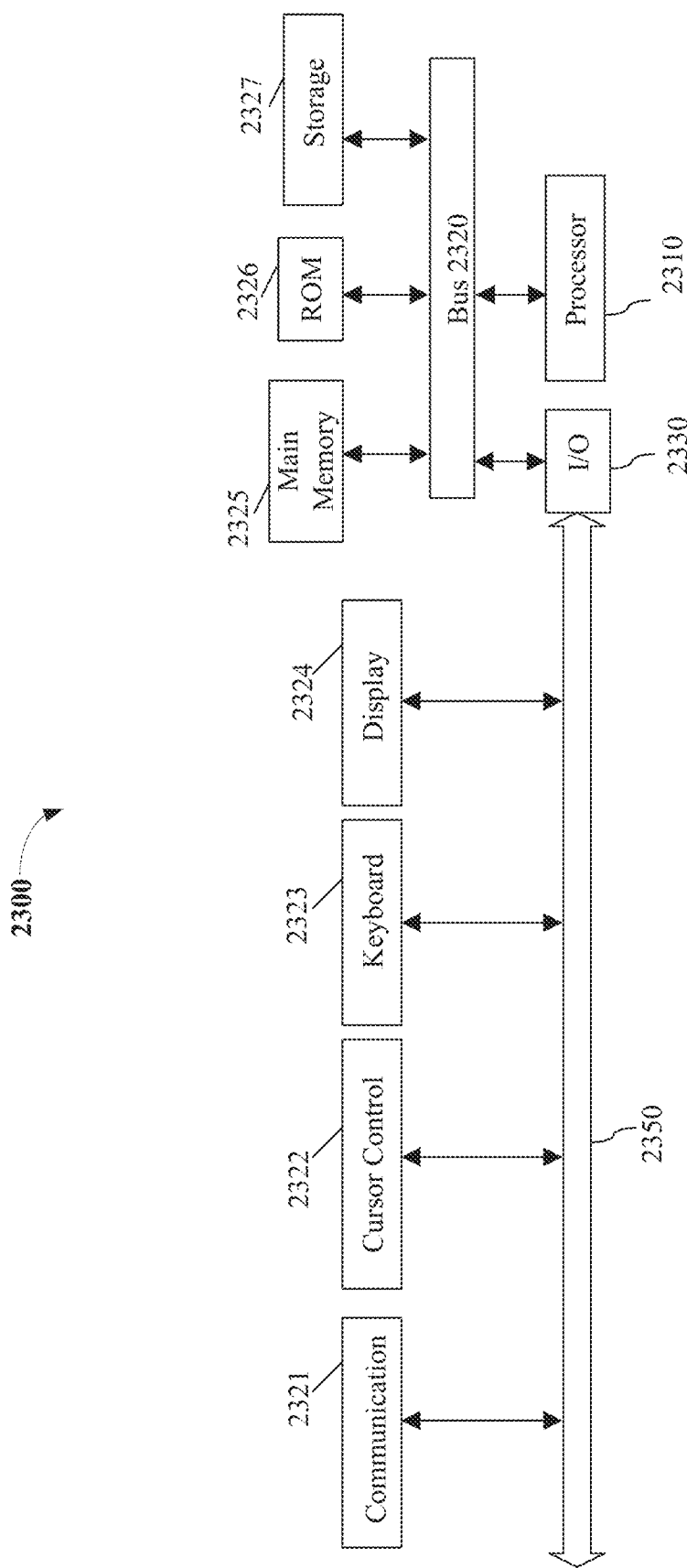
FIG. 23 illustrates one embodiment of a computer system.

FIG. 23 illustrates a computer system 2300 on which printing system 130 and/or compensation module 216 may be implemented. Computer system 2300 includes a system bus 2320 for communicating information, and a processor 2310 coupled to bus 2320 for processing information.

Computer system 2300 further comprises a random-access memory (RAM) or other dynamic storage device 2325 (referred to herein as main memory), coupled to bus 2320 for storing information and instructions to be executed by processor 2310. Main memory 2325 also may be used for storing temporary variables or other intermediate information during execution of instructions by processor 2310. Computer system 2300 also may include a read only memory (ROM) and or other static storage device 2326 coupled to bus 2320 for storing static information and instructions used by processor 2310.

A data storage device 2327 such as a magnetic disk or optical disc and its corresponding drive may also be coupled to computer system 2300 for storing information and instructions. Computer system 2300 can also be coupled to a second I/O bus 2350 via an I/O interface 2330. A plurality of I/O devices may be coupled to I/O bus 2350, including a display device 2324, an input device (e.g., an alphanumeric input device 2323 and or a cursor control device 2322). The communication device 2321 is for accessing other computers (servers or clients). The communication device 2321 may comprise a modem, a network interface card, or other well-known interface device, such as those used for coupling to Ethernet, token ring, or other types of networks.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Some embodiments pertain to Example 1 that includes a system comprising at least one physical memory device to store compensation logic and one or more processors coupled with the at least one physical memory device to execute the compensation logic to generate transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count.

Example 2 includes the subject matter of Example 1, wherein the compensation logic further to generate a first ink deposition function for each of a plurality of color planes, wherein the first ink deposition function is associated with a first group of pel forming elements, generate a second ink deposition function for each of the plurality of color planes, wherein the second ink deposition function is associated with the first group of pel forming elements further comprising one or more overlapping pel forming elements, generate a third ink deposition function for each of the plurality of color planes, wherein the third ink deposition function is associated with a second group of pel forming elements generate a fourth ink deposition function for each of the plurality of color planes, wherein the fourth ink deposition function is associated with the second group of pel forming elements further comprising the one or more overlapping pel forming elements and generate the transfer functions for each of the plurality of color planes based on the first ink deposition function, the second ink deposition function, the third ink deposition function and the fourth ink deposition function.

Example 3 includes the subject matter of Examples 1 and 2, wherein the first group comprises a local group of pel forming elements and the second group comprises a non-local group of pel forming elements.

Example 4 includes the subject matter of Examples 1-3, wherein generating the first, second, third and fourth ink deposition functions comprises generating a first Gaussian profile associated with the local group of pel forming elements, generating a second Gaussian profile associated with the local group of pel forming elements having the one or more overlapping pel forming elements, generating a third Gaussian profile associated with the non-local group of pel forming elements and generating a fourth Gaussian profile associated with the non-local group of pel forming elements having the one or more overlapping pel forming elements.

Example 5 includes the subject matter of Examples 1-4, wherein generating the first, second, third and fourth ink deposition functions further comprises combining the first, second, third and fourth ink deposition functions Gaussian profiles to generate local ink contribution data for each of the plurality of color planes.

Example 6 includes the subject matter of Examples 1-5, wherein generating first, second, third and fourth ink deposition functions ink deposition functions further comprises combining the local ink contribution data with large-scale ink contribution data to generate large-scale ink deposition data that matches the large-scale ink contribution data.

Example 7 includes the subject matter of Examples 1-6, wherein the ink deposition functions are associated with a spacing amount for the overlapping pel forming elements and the non-overlapping pel forming elements and an overlap amount.

Example 8 includes the subject matter of Examples 1-7, wherein an ink deposition function further comprises a function of a pel forming element position and input digital count.

Example 9 includes the subject matter of Examples 1-8, wherein the first, second and third ink deposition functions correspond to a first halftone design.

Example 10 includes the subject matter of Examples 1-9, wherein the compensation logic applies the transfer functions to generate a fifth ink deposition function for each of a plurality of color planes wherein the fifth ink deposition function comprises an ink deposition function for the local group of pel forming elements having the one or more overlapping pel forming elements.

Example 11 includes the subject matter of Examples 1-10, wherein the compensation logic verifies whether a difference between the fifth ink deposition function and the second ink deposition function is within a predetermined threshold.

Example 12 includes the subject matter of Examples 1-11, wherein the compensation logic validates an acceptable compensation upon determining that the difference is within the predetermined threshold.

Example 13 includes the subject matter of Examples 1-12, further comprising a print engine comprising a plurality of pel forming elements.

Some embodiments pertain to Example 14 that includes a method comprising generating transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count.

Example 15 includes the subject matter of Example 14, further comprising generating a first ink deposition function for each of a plurality of color planes, wherein the first ink deposition function is associated with a first group of pel forming elements, generating a second ink deposition function for each of the plurality of color planes, wherein the second ink deposition function is associated with the first group of pel forming elements further comprising one or more overlapping pel forming elements, generating a third ink deposition function for each of the plurality of color planes, wherein the third ink deposition function is associated with a second group of pel forming elements, generating a fourth ink deposition function for each of the plurality of color planes, wherein the fourth ink deposition function is associated with the second group of pel forming elements further comprising the one or more overlapping pel forming elements and generating the transfer functions for each of the plurality of color planes based on the first ink deposition function, the second ink deposition function, the third ink deposition function and the fourth ink deposition function.

Example 16 includes the subject matter of Examples 14 and 15, wherein the first group comprises a local group of pel forming elements and the second group comprises a non-local group of pel forming elements.

Example 17 includes the subject matter of Examples 14-16, wherein generating the first, second, third and fourth ink deposition functions comprises generating a first Gaussian profile associated with the local group of pel forming elements, generating a second Gaussian profile associated with the local group of pel forming elements having the one or more overlapping pel forming elements, generating a third Gaussian profile associated with the non-local group of pel forming elements and generating a fourth Gaussian profile associated with the non-local group of pel forming elements having the one or more overlapping pel forming elements.

Some embodiments pertain to Example 18 that includes at least one computer readable medium having instructions stored thereon, which when executed by one or more processors, cause the processors to generate transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count Example 19 includes the subject matter of Example 18, having instructions stored thereon, which when executed by one or more processors, cause the processors to generate a first ink deposition function for each of a plurality of color planes, wherein the first ink deposition function is associated with a first group of pel forming elements, generate a second ink deposition function for each of the plurality of color planes, wherein the second ink deposition function is associated with the first group of pel forming elements further comprising one or more overlapping pel forming elements, generate a third ink deposition function for each of the plurality of color planes, wherein the third ink deposition function is associated with a second group of pel forming elements generate a fourth ink deposition function for each of the plurality of color planes, wherein the fourth ink deposition function is associated with the second group of pel forming elements further comprising the one or more overlapping pel forming elements and generate the transfer functions for each of the plurality of color planes based on the first ink deposition function, the second ink deposition function, the third ink deposition function and the fourth ink deposition function.

Example 20 includes the subject matter of Examples 18 and 19, wherein the first group comprises a local group of pel forming elements and the second group comprises a non-local group of pel forming elements.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A system comprising:
    at least one physical memory device to store compensation logic; and
    one or more processors coupled with the at least one physical memory device to execute the compensation logic to:
        generate transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count.

2. The system of claim 1, wherein the compensation logic further to:

generate a first ink deposition function for each of the plurality of color planes, wherein the first ink deposition function is associated with a first group of pel forming elements;

generate a second ink deposition function for each of the plurality of color planes, wherein the second ink deposition function is associated with the first group of pel forming elements further comprising one or more overlapping pel forming elements;

generate a third ink deposition function for each of the plurality of color planes, wherein the third ink deposition function is associated with a second group of pel forming elements;

generate a fourth ink deposition function for each of the plurality of color planes, wherein the fourth ink deposition function is associated with the second group of pel forming elements further comprising the one or more overlapping pel forming elements; and generate the transfer functions for each of the plurality of color planes based on the first ink deposition function, the second ink deposition function, the third ink deposition function and the fourth ink deposition function.

3. The system of claim 2, wherein the first group comprises a local group of pel forming elements and the second group comprises a non-local group of pel forming elements.

4. The system of claim 3, wherein generating the first, second, third and fourth ink deposition functions comprises generating a first Gaussian profile associated with the local group of pel forming elements, generating a second Gaussian profile associated with the local group of pel forming elements having the one or more overlapping pel forming elements, generating a third Gaussian profile associated with the non-local group of pel forming elements and generating a fourth Gaussian profile associated with the non-local group of pel forming elements having the one or more overlapping pel forming elements.

5. The system of claim 4, wherein generating the first, second, third and fourth ink deposition functions further comprises combining the first, second, third and fourth ink deposition functions Gaussian profiles to generate local ink contribution data for each of the plurality of color planes.

6. The system of claim 5, wherein generating first, second, third and fourth ink deposition functions ink deposition functions further comprises combining the local ink contribution data with large-scale ink contribution data to generate large-scale ink deposition data that matches the large-scale ink contribution data.

7. The system of claim 1, wherein the ink deposition functions are associated with a spacing amount for the overlapping pel forming elements and the non-overlapping pel forming elements and an overlap amount.

8. The system of claim 1, wherein an ink deposition function further comprises a function of a pel forming element position and the input digital count.

9. The system of claim 1, wherein the first, second and third ink deposition functions correspond to a first halftone design.

10. The system of claim 3, wherein the compensation logic applies the transfer functions to generate a fifth ink deposition function for each of the plurality of color planes wherein the fifth ink deposition function comprises an ink deposition function for the local group of pel forming elements having the one or more overlapping pel forming elements.

11. The system of claim 10, wherein the compensation logic verifies whether a difference between the fifth ink deposition function and the second ink deposition function is within a predetermined threshold.

12. The system of claim 11, wherein the compensation logic validates an acceptable compensation upon determining that the difference is within the predetermined threshold.

13. The system of claim 1, further comprising a print engine comprising a plurality of pel forming elements.

14. A method comprising:

generating transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count.

15. The method of claim 14, further comprising:

generating a first ink deposition function for each of the plurality of color planes, wherein the first ink deposition function is associated with a first group of pel forming elements;

generating a second ink deposition function for each of the plurality of color planes, wherein the second ink deposition function is associated with the first group of pel forming elements further comprising one or more overlapping pel forming elements;

generating a third ink deposition function for each of the plurality of color planes, wherein the third ink deposition function is associated with a second group of pel forming elements;

generating a fourth ink deposition function for each of the plurality of color planes, wherein the fourth ink deposition function is associated with the second group of pel forming elements further comprising the one or more overlapping pel forming elements; and generating the transfer functions for each of the plurality of color planes based on the first ink deposition function, the second ink deposition function, the third ink deposition function and the fourth ink deposition function.

16. The method of claim 15, wherein the first group comprises a local group of pel forming elements and the second group comprises a non-local group of pel forming elements.

17. The method of claim 16, wherein generating the first, second, third and fourth ink deposition functions comprises:

generating a first Gaussian profile associated with the local group of pel forming elements;

generating a second Gaussian profile associated with the local group of pel forming elements having the one or more overlapping pel forming elements;

generating a third Gaussian profile associated with the non-local group of pel forming elements; and generating a fourth Gaussian profile associated with the non-local group of pel forming elements having the one or more overlapping pel forming elements.

18. At least one non-transitory computer readable medium having instructions stored thereon, which when executed by one or more processors, cause the processors to:

generate transfer functions for each of a plurality of color planes to compensate for overlapping pel forming elements of adjacent printheads, wherein the transfer functions are generated based on ink deposition functions for groups of pel forming elements including non-overlapping pel forming elements and the overlapping pel forming elements, wherein the transfer functions transform input digital counts, and wherein the ink deposition functions represent output ink amount versus input digital count.

19. The computer readable medium of claim 18, having instructions stored thereon, which when executed by one or more processors, cause the processors to:

generate a first ink deposition function for each of the plurality of color planes, wherein the first ink deposition function is associated with a first group of pel forming elements;

generate a second ink deposition function for each of the plurality of color planes, wherein the second ink deposition function is associated with the first group of pel forming elements further comprising one or more overlapping pel forming elements;

generate a third ink deposition function for each of the plurality of color planes, wherein the third ink deposition function is associated with a second group of pel forming elements;

generate a fourth ink deposition function for each of the plurality of color planes, wherein the fourth ink deposition function is associated with the second group of pel forming elements further comprising the one or more overlapping pel forming elements; and generate the transfer functions for each of the plurality of color planes based on the first ink deposition function, the second ink deposition function, the third ink deposition function and the fourth ink deposition function.

20. The computer readable medium of claim 19, wherein the first group comprises a local group of pel forming elements and the second group comprises a non-local group of pel forming elements.

* * * * *